(12) United States Patent
Arce et al.

(10) Patent No.: US 10,817,971 B2
(45) Date of Patent: *Oct. 27, 2020

(54) SYSTEM AND METHOD FOR EMBEDDING OF A TWO DIMENSIONAL CODE WITH AN IMAGE

(71) Applicant: Graphiclead LLC, Newark, DE (US)

(72) Inventors: Gonzalo R. Arce, Newark, DE (US); Gonzalo J. Garateguy, Framingham, MA (US); Daniel L. Lau, Lexington, KY (US)

(73) Assignee: Graphiclead LLC, Newark, DE (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/815,927

(22) Filed: Nov. 17, 2017

(65) Prior Publication Data

US 2018/0075570 A1    Mar. 15, 2018

Related U.S. Application Data

(63) Continuation of application No. 14/701,822, filed on May 1, 2015, now Pat. No. 9,865,027.
(Continued)

(51) Int. Cl.
*G06K 9/00* (2006.01)
*G06T 1/00* (2006.01)
(Continued)

(52) U.S. Cl.
CPC ...... *G06T 1/0021* (2013.01); *G06K 19/06037* (2013.01); *G06K 19/06103* (2013.01);
(Continued)

(58) Field of Classification Search
CPC ... G06T 1/0021; G06T 1/0028; G06T 1/0007; G06T 11/001; G06T 5/004;
(Continued)

(56) References Cited

U.S. PATENT DOCUMENTS

| 5,726,435 A | 3/1998 | Hara et al. |
| 7,950,589 B2 | 5/2011 | Oouchi |

(Continued)

FOREIGN PATENT DOCUMENTS

| EP | 1973330 B1 | 9/2008 |
| WO | 2013043534 A1 | 3/2013 |

(Continued)

OTHER PUBLICATIONS

Chu, Hung-Kuo, et al. "Halftone QR codes." ACM Transactions on Graphics (TOG) 32.6 (2013) (Year: 2013).*

(Continued)

*Primary Examiner* — Andrew M Moyer
(74) *Attorney, Agent, or Firm* — RatnerPrestia

(57) ABSTRACT

Disclosed are a method and apparatus for embedding a graphic image representation into a two dimensional matrix code by modifying the characteristic values of individual pixels in the image according the values of a provided two dimensional matrix code image. The modified character pixel values are determined using an optimization procedure that minimizes a visual distortion with respect to the original graphic image representation while maintaining the value of a probability of error model below a specified limit.

17 Claims, 11 Drawing Sheets

Related U.S. Application Data

(60) Provisional application No. 61/990,780, filed on May 9, 2014.

(51) Int. Cl.
 G06T 5/00 (2006.01)
 G06T 11/00 (2006.01)
 G06K 19/06 (2006.01)

(52) U.S. Cl.
 CPC .......... G06T 1/0007 (2013.01); G06T 1/0028 (2013.01); G06T 5/004 (2013.01); G06T 11/001 (2013.01); *G06T 2201/0061* (2013.01)

(58) Field of Classification Search
 CPC ...... G06T 2201/0061; G06K 19/06103; G06K 19/06037
 USPC .................................................. 382/100, 294
 See application file for complete search history.

(56) References Cited

U.S. PATENT DOCUMENTS

| | | | |
|---|---|---|---|
| 8,144,922 | B2 | 3/2012 | Kawabe et al. |
| 8,851,392 | B2 | 10/2014 | Shinotani et al. |
| 8,978,989 | B2 | 3/2015 | Friedman et al. |
| 9,865,027 | B2 * | 1/2018 | Arce .................... G06T 1/0021 |
| 2010/0195834 | A1 | 8/2010 | Amagai |
| 2013/0021364 | A1 * | 1/2013 | Azuma ............ G06K 19/06103 345/589 |
| 2013/0026239 | A1 | 1/2013 | Sakahashi |
| 2013/0026241 | A1 | 1/2013 | Sakahashi |
| 2013/0112760 | A1 * | 5/2013 | Schory ............. G06K 19/06037 235/494 |
| 2013/0221105 | A1 * | 8/2013 | Cheong ............ G06K 19/06037 235/469 |
| 2014/0144996 | A1 | 5/2014 | Friedman |
| 2014/0263666 | A1 | 9/2014 | Prince |

FOREIGN PATENT DOCUMENTS

| | | |
|---|---|---|
| WO | 2013124837 A1 | 8/2013 |
| WO | 2014002086 A3 | 1/2014 |

OTHER PUBLICATIONS

Garateguy, Gonzalo J., et al. "QR images: optimized image embedding in QR codes." IEEE transactions on image processing 23.7 (2014): 2842-2853 (Year: 2014).*

Fang, Chengfang, Chunwang Zhang, and Ee-Chien Chang. "An optimization model for aesthetic two-dimensional barcodes." International Conference on Multimedia Modeling. Springer, Cham, 2014 (Year: 2014).*

International Preliminary Search Report on Patentability and Written Opinion of the International Searching Authority, dated Nov. 16, 2017, 10 pages.

"Visual Lead," Kaedan Capital investment group, Apr. 2012. [Online]. Available: http://www.visualead.com/, [Accessed Jul. 2013], pp. 1-5.

Analoui, M. and Allebach, J., "Model Based Halftoning Using Direct Binary Search," SPIE vol. 1666 Human Vision, Visual Processing, and Digital Display III, pp. 96-108, 1992.

Baharav, Z. and Kakarala, R., "Visually significant QR codes: Image blending and statistical analysis," in IEEE International Conference on Multimedia and Expo (ICME), pp. 1-6, 2013.

Bertsekas, D., "Nonlinear Programming, Second Edition," Athena Scientific, Belmont, Massachusetts, 1995.

Brink, A.D. and Pendock, N.E., "Minimum Cross-Entropy Threshold Selection," Pattern Recognition, vol. 29, No. 1, pp. 179-188, 1996.

Byrd, R. et al., "A Trust Region Method Based on Interior Point Techniques for Nonlinear Programming," HAL Archives-Ouvertes, Research Report RR-2896, 1996.

Chu, H. et al., "Halftone QR Codes," in ACM Transactions on Graphics, vol. 32, No. 6, Article 217, pp. 217:1-217:8, 2013.

Cox, R., "QArt Codes," Apr. 2012. [Online]. Available http://research.swtch.com/ qart. pp. 1-8, retrieved on May 4, 2015.

Fang, C. et al., "An Optimization Model for Aesthetic Two-Dimensional Barcodes," Multimedia Modeling—Lecture Notes in Computer Science, vol. 8325, pp. 278-290.

Fujita, K. et al., "Expansion of Image Displayable Area in Design QR Code and Its Applications," in Forum on Information Technology Proceedings, Japan, pp. 1-4, 2011.

Garateguy, G. et al., "QR Images: Optimized Image Embedding in QR Codes," IEEE Transactions on Image Processing, vol. 23, No. 7, pp. 2842-2853, Jul. 2014.

Garateguy, G. et al., "Voronoi Tessellated Halftone Masks," IEEE 17th International Conference on Image Processing, pp. 529-532, 2010.

International Search Report and Written Opinion of the International Searching Authority for International Application No. PCT/US2015/028757 dated Sep. 2, 2015.

International Standard ISO/IEC 18004, First Edition, "Information Technology—Automatic Identification and Data Capture Techniques—Bar Code Symbology" QR Code, Jun. 15, 2000.

Lau, D. and Arce, G., "Modern Digital Halftoning, Second Edition," CRC Press, 2008 (Summary Only).

Lau, D. et al., "Blue-and Green-Noise Halftoning Models, A review of the spatial and spectral characteristics of halftone textures," IEEE Signal Processing Magazine, pp. 28-38, 2003.

Lau, D. et al., "Digital Color Halftoning with Generalized Error Diffusion and Multichannel Green-Noise Masks," IEEE Transactions on Image Processing, vol. 9, No. 5, pp. 923-935, 2000.

Lau, D. et al., "Digital halftoning by means of green-noise masks," J. Opt. Soc. Am. A, vol. 16, No. 7, pp. 1575-1586, 1999.

Lau, D. et al., "Green-Noise Digital Halftoning," Proceedings of the IEEE, vol. 86, No. 12, 1998, pp. 2424-2444.

Lin, Y-S. et al., "Artistic QR Code Embellishment," Computer Graphics Forum, vol. 32, No. 7, pp. 137-146, 2013.

Lin, Y. et al., "Appearance-based QR Code Beautifier," IEEE Transactions on Multimedia, vol. 15, No. 8, pp. 2198-2207, 2013.

Naesaenen, Risto, "Visibility of Halftone Dot Textures," IEEE Transactions on Systems, Man, and Cybernetics, vol. SMC-14, No. 6, pp. 920-924, 1984.

Niblack, Wayne, "An Introduction to Digital Image Processing," First Edition, 1985, Chapter 5.0 Segmentation, pp. 113-127.

Ono, S. et al., "Two-Dimensional Barcode Decoration Based on Real-Coded Genetic Algorithm", 2008 IEEE Congress on Evolutionary Computaton (CEC 2008), pp. 1068-1073.

Otsu, N., "A Threshold Selection Method from Gray-Level Histograms," IEEETransactions on Systems, Man, and Cybernetics, vol. SMC-9, No. 1, pp. 62-66, 1979.

Rodriguez, J. B. et al., "Blue-noise multitone dithering," Image Processing, IEEE Transactions on, vol. 17, No. 8, pp. 1368-1382, 2008.

Samretwit, D. and Wakahara, T., "Measurement of Reading Characteristics of Multiplexed Image in QR Code," in Third International Conference on Intelligent Networking and Collaborative Systems (INCoS), pp. 552-557, 2011.

Sauvola, J. and Pietikaeinen, M., "Adaptive document image binarization," Pattern Recognition 33, pp. 225-236, 2000.

Soon, T.J., "Section Three, QR Code," Synthesis Journal, pp. 59-78, 2008.

Stevenson, R.L. and Arce, G.R., "Binary display of hexagonally sampled continuous-tone images," J. Opt. Soc. Am. A, vol. 2, No. 7, pp. 1009-1013, 1985.

Trussell, H. et al,. "Color Image Processing, Basic and Special Issue Overview," IEEE Signal Processing Magazing, pp. 14-22, 2005.

Ulichney, R. "The void-and-cluster method for dither array generation," SPIE, vol. 1913, pp. 332-343, 1993.

Wakahara, T and Yamamoto, N., "Image Processing of 2-Dimensional Barcode," in 14th International Conference on Network-Based Information Systems (NBiS), pp. 484-490, 2011.

(56) References Cited

OTHER PUBLICATIONS

Wang, Z. et al. "Image quality assessment: From error visibility to structural similarity," IEEE Transactions on Image Processing, vol. 13, No. 4, pp. 600-612, 2004.
Yang, H. et al., "Binarization of Low-Quality Barcode Images Captured by Mobile Phones Using Local Window of Adaptive Location and Size," IEEE Transactions on Image Processing, vol. 21, No. 1, pp. 418-425, 2012.
Zhou, J. et al., "Research on Binarization of QR Code Image," IEEE, pp. 1-4, 2010.
Zxing library, Open Source QR code generation software library https://code.google.com/p/zxing/ [retrieved on Aug. 21, 2015].
James, Frederick. "A review of pseudorandom number generators." Computer Physics Communications 60.3 (1990): 329-344, Dec. 1988.

\* cited by examiner

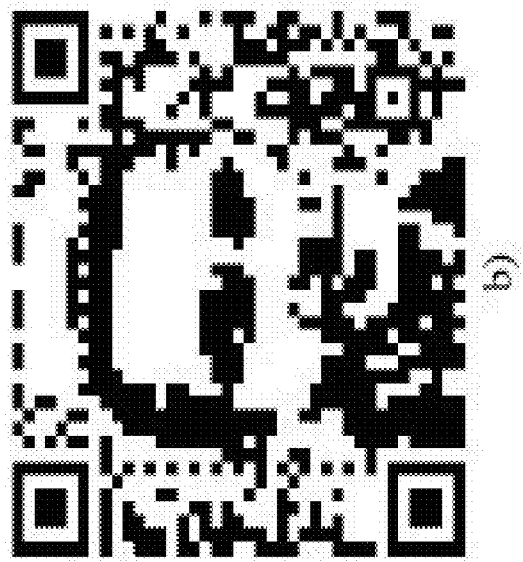
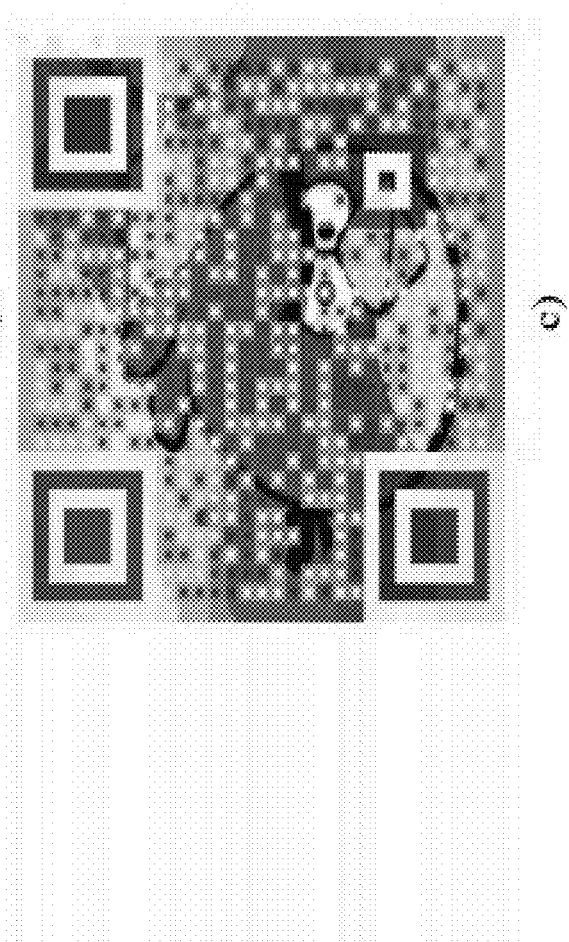
FIG. 1
(PRIOR ART)

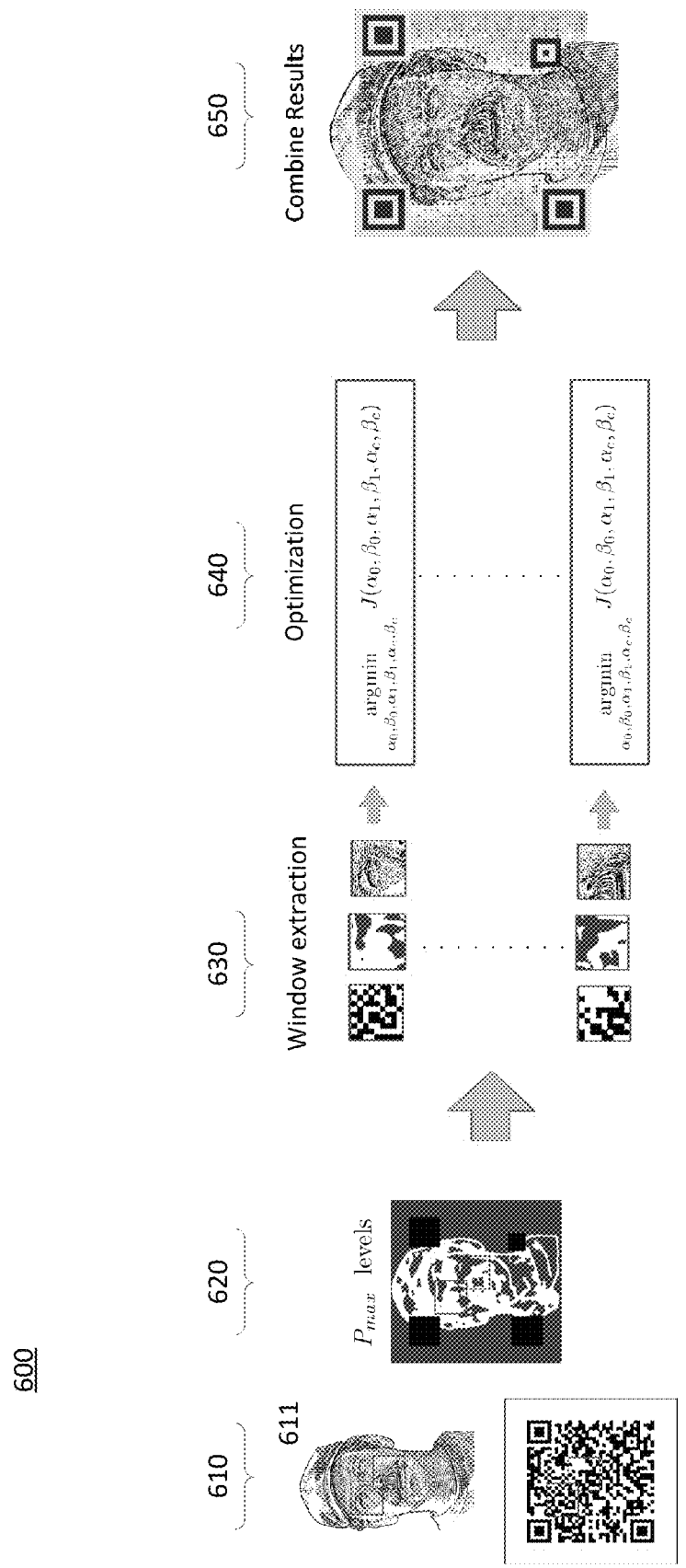

FIG. 7A
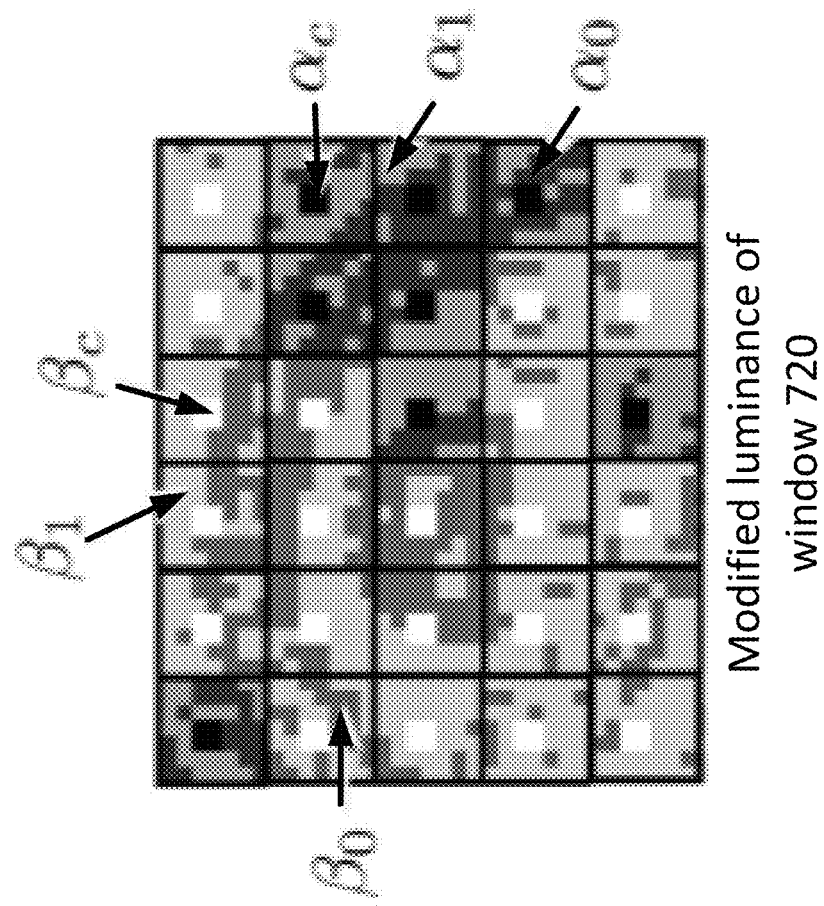
Modified luminance of window 720
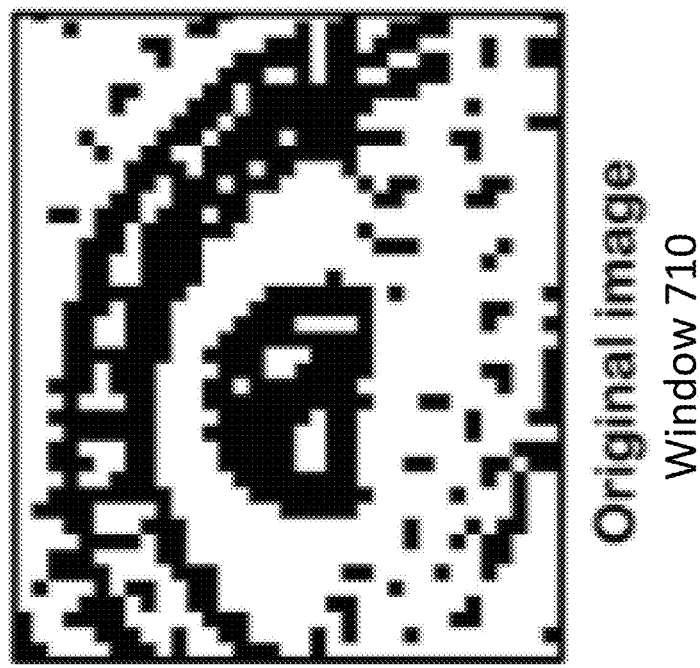
Original image Window 710

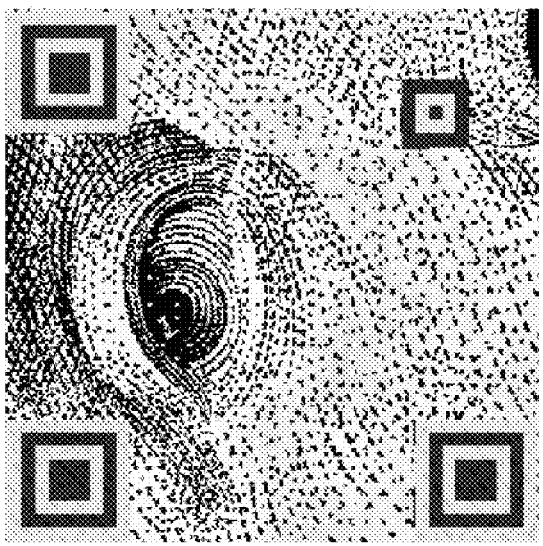
FIG. 7B

800

SYSTEM AND METHOD FOR EMBEDDING OF A TWO DIMENSIONAL CODE WITH AN IMAGE

RELATED APPLICATIONS

This application is a continuation of U.S. patent application Ser. No. 14/701,822 filed May 1, 2015, which claims priority to and the benefit of U.S. Provisional Application No. 61/990,780 Filed May 9, 2014 entitled "Optimal Embedding of QR Codes into Color and Gray Scale Images," the entire contents of all of which are incorporated herein by reference.

TECHNICAL FIELD

The present subject matter relates to techniques and equipment to generate an embedded image based on a graphic image representation and a two dimensional machine readable code.

BACKGROUND

Machine readable codes have been used for a number of years to manage inventories, such as automobile parts in a factory, track products, such as mail pieces, and for purchasing items at a store. Most people are familiar with the straight lines that form the universal product codes (UPC) barcodes on products that we purchase. Scanning the UPC with a scanner at a point of sale device (i.e., cash register), identifies the product and provides the price of the product for collection by the cashier operating the point of sale device.

The UPC barcode is an example of a one dimensional (1D) barcode. It has information in the horizontal direction. In recent years, two dimensional codes, which are codes that store information in both the horizontal and vertical directions, have become prevalent. Two dimensional (2D) machine readable codes, such as data matrix codes, maxicodes, QR codes and the like, are capable of storing more information in a smaller space than a 1D code.

For example, a 2D dimensional code, such as a maxicode, is capable of storing up to 93 characters, while a QR code is capable of storing 7,089 numerical values (i.e., 0-9) or 1,817 Kanji/Kana characters. Therefore, of the 2D codes, the QR code is one of the predominant 2D codes, if not the predominant 2D code currently being used.

QR codes, for example, are among the most widespread forms of engaging mobile users from printed materials. These particular 2D codes provide a reliable and convenient way to introduce textual information into mobile devices without the difficulty of typing complicated chains of characters. The QR codes are used to access websites, download personal card information, post information to social networks, initiate phone calls, reproduce videos or open text documents or any other form of content capable of being encoded as a string of characters within the limitations of the QR Code Standard, which is the AIM International (Automatic Identification Manufacturers International) standard (ISS-QR Code). Additionally, QR codes also provide an effective way to measure the impact and reach of publicity materials since each code scan can be used by a computer application or server associated with the QR code to provide information about the location, date and time in which a particular user expressed interest in the products. These applications are clearly outside of the original functional purpose for which QR codes were designed, and considerations such as visual appeal and ease of integration into advertising play an important role in addition to robustness and speed of decoding.

However, the nature of the 2D codes, such as dark/light areas in square, circular or rectangular form with large alignment and/or finder patterns, makes them aesthetically unappealing. Therefore, in order to increase the usage of the 2D codes by making them more appealing to brand name producers and branding professionals, attempts have been made to embed the 2D codes into graphic images (or vice versa) in attempt to make the 2D code more aesthetically pleasing.

Previous attempts have failed to provide much improvement to the aesthetics of the 2D code. For example, FIG. 1 shows the results of prior attempts at improving the appearance of 2D codes, in particular, the QR code embedded image. The simplest method of embedding images into QR codes is by replacing some area containing data in the QR code with pixels from the graphic image. In order to retain a high likelihood of decodability, the ratio between image and code area should be approximately proportional to the correction capacity (e.g., built in error correction bits) of the 2D code. This simple approach is common for logos or images, which are positioned at the center of the QR code as depicted in FIG. 1, code (a). The approach in FIG. 1, code (b) takes advantage of linear properties of Reed-Solomon codes to manipulate the data containing areas of the QR code such that the resulting code resembles the original image. Generated codes using this method do not have occluded QR data areas; however, their coarseness has an impact on the capability of the technique to trade visual distortion for decoding robustness as seen in FIG. 1, code (b). The approach in FIG. 1, code (c) is based on a method where the luminance of the image is changed according to the code structure. The visual quality is improved by altering the luminance at the center of each QR module according to the value of the QR code while the remaining pixels are less altered. This approach provides an adequate tradeoff between robustness and distortion, but the coarse structure of QR bits creates undesirable artifacts as seen in FIG. 1, code (c).

Hence a need exists for improving the aesthetics (i.e., reduced artifacts and distribution of image throughout the 2D code) of a graphic image in which a 2D code is embedded, while still maintaining the detectability and decodability of the embedded 2D code.

SUMMARY

The concepts disclosed herein alleviate the above noted problems with embedding a graphic image representation into a two dimensional matrix code (or vice versa). The foregoing examples describe a method and system in which modified luminance values are determined by means of an optimization procedure that minimizes a visual distortion metric with respect to the original graphic image representation, while maintaining a value of a probability of decoding and a detection error model below a specified limit.

Disclosed is a method for generating an embedded image that includes a two dimensional code image embedded within a graphic image. The method includes obtaining, by a processor, the graphic image. The graphic image is represented as a matrix with M rows and N columns of pixels, and each pixel has a respective value from a range of values and row and column coordinates within the M by N matrix. A two dimensional code image is obtained that is represented as a matrix with M rows and N columns of pixels.

Each two dimensional code image pixel may have either a first value or a second value and row and column coordinates within the M by N matrix. The M by N graphic image matrix is subdivided into sub-blocks of m rows and n columns of pixels, where m is less than M and n is less than N. A subdivision of the M by N two dimensional code image matrix into subblocks of m rows and n columns of pixels is also performed, and m is less than M and n is less than N. Each subblock of the two dimensional code corresponds to a subblock of the graphic image having an identical pixel row and column coordinates as the two dimensional code subblock. Pixels in each graphic image subblock that are suitable for value modification based pixels in the obtained two dimensional code image are identified. Each identified pixel corresponds to a pixel in a subblock of the two dimensional code with an identical pixel row and column coordinates. Values of the identified pixels in each graphic image subblock are modified based on a probability of detection model related to the obtained two dimensional code image. For each subblock of the two dimensional code, pixel values in the two dimensional code subblock are replaced with the modified pixel value of the identical pixel row and column coordinate from the graphic image subblock.

In another example, a method for encoding data in a graphic image is disclosed. The method includes receiving, by a processor, data to encode. From the data, a QR code is generated. The generated QR code is represented as a matrix with M rows and N columns and where each element of the matrix is one of two unique values. A graphic image is retrieved from a data storage. A graphic image matrix is generated with M rows and N columns in which each element of the graphic image matrix has a value defined as a function of the image stored in the data storage. The QR code matrix and the graphic image matrix are divided into sub-blocks of m rows and n columns of elements. A sub-set of element values of the graphic image matrix inside a graphic image subblock are modified based upon the element values of QR code elements in a QR code subblock with the same element rows and columns as the graphic image subblock. A subset of elements in a corresponding QR code subblock of the QR code matrix are defined. The element values of the defined subset of elements in the corresponding subblock of the QR code matrix are replaced with the modified element values of the graphic image matrix sub block.

A system for encoding data in a graphic image is also disclosed. The system includes a data storage, at least one user interface element, a network interface and a processor. The processor is coupled to the data storage, the at least one user interface element and the network interface, wherein the processor is programmed with machine-readable instructions for controlling the system to perform functions. The processor performs functions of obtaining the graphic image. The graphic image is represented as a matrix with M rows and N columns of pixels, and each pixel has a respective value from a range of values and row and column coordinates within the M by N matrix. The processor obtains a two dimensional code image that is represented as a matrix with M rows and N columns of pixels. Each two dimensional code image pixel may have either a first value or a second value and row and column coordinates within the M by N matrix. The M by N graphic image matrix is subdivided by the processor into sub-blocks of m rows and n columns of pixels, where m is less than M and n is less than N. A subdivision of the M by N two dimensional code image matrix into subblocks of m rows and n columns of pixels is also performed by the processor, and in the subblocks m is less than M and n is less than N. Each subblock of the two dimensional code corresponds to a subblock of the graphic image having an identical pixel row and column coordinates as the two dimensional code subblock. The processor identifies pixels in each graphic image subblock that are suitable for value modification based pixels in the obtained two dimensional code image. Each identified pixel corresponds to a pixel in a subblock of the two dimensional code with an identical pixel row and column coordinates. Values of the identified pixels in each graphic image subblock are modified by the processor based on a probability of detection model related to the obtained two dimensional code image. For each subblock of the two dimensional code, the processor replaces pixel values in the two dimensional code subblock with the modified pixel value of the identical pixel row and column coordinate from the graphic image subblock.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawing figures depict one or more implementations in accordance with the present concepts, by way of example only, not by way of limitations. In the figures, like reference numerals refer to the same or similar elements.

FIG. 1 depicts prior art results (a), (b), and (c) of attempts at embedding QR codes into a graphical image.

FIG. 6 provides a graphical example of the FIG. 2 embedding process for the case of binary embedded images.

FIG. 7A illustrates an example of binary luminance modification based on the examples described with respect to FIGS. 2 and 6.

FIG. 7B illustrates an example of an embedded image generated based on the examples described with respect to FIGS. 2 and 6.

Figure 2:
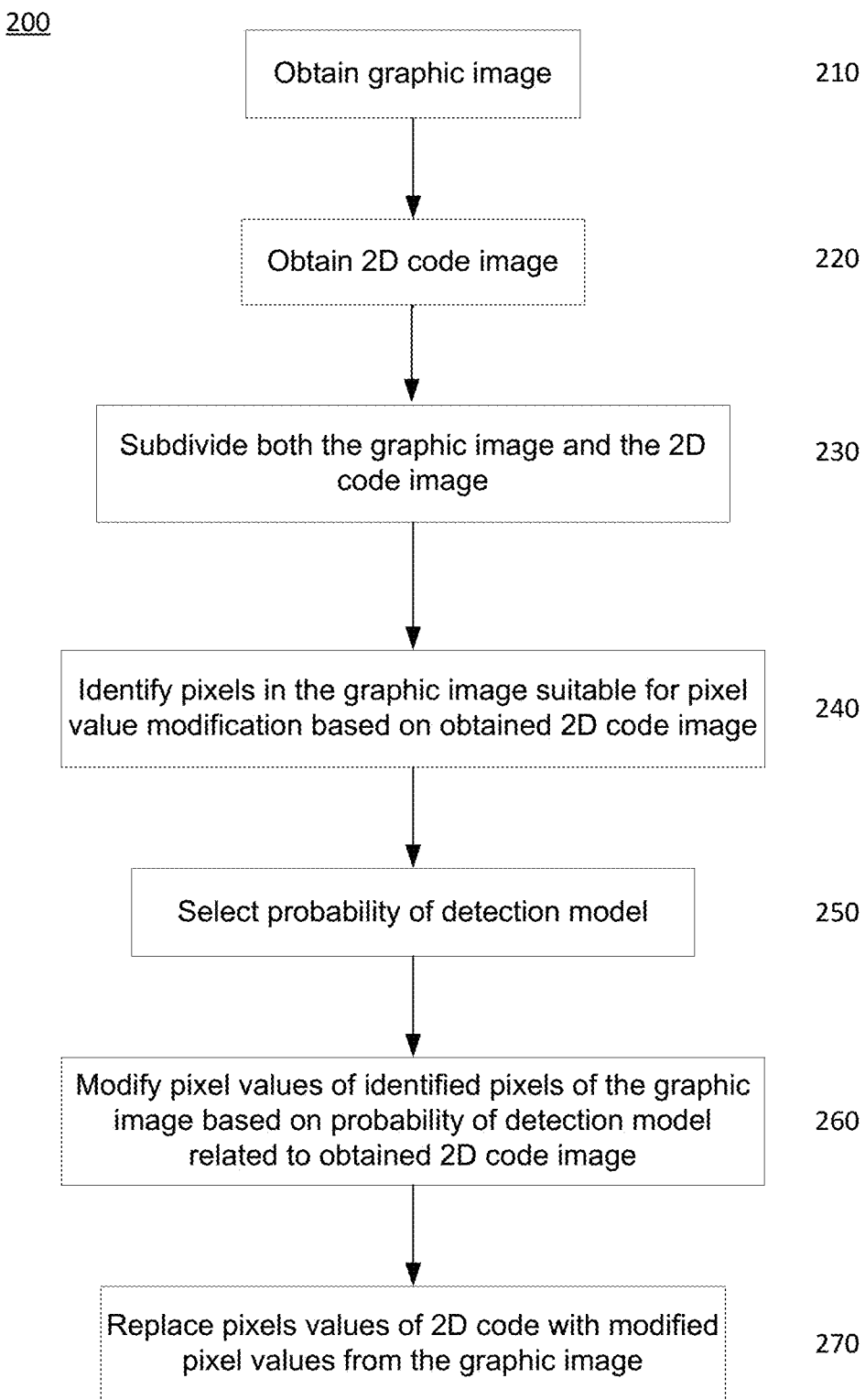
FIG. 2 provides a flow chart of an exemplary embedding process as described herein for color and grayscale images.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the described examples.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Before describing in detail embodiments that are in accordance with the presently disclosed subject matter, it should be observed that the examples reside primarily in combinations of method steps and apparatus components related to embedding graphic representation into a matrix code. Accordingly, the apparatus components and method steps have been represented where appropriate by conventional symbols in the drawings, showing only those specific details that are pertinent to understanding the examples of the presently disclosed subject matter so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The method or apparatus according to the presently disclosed examples embodies a technique to embed a graphic representation such as color, grayscale or monochromatic logos or images into a 2D code, such as a QR matrix code. The embedding process examples are based on an iterative process which alternates between two stages. The first stage is the selection of pixels in the original graphic representation whose luminance are to be modified, and the second stage is the optimization of the luminance levels from the selected pixels in smaller subdivision of the original graphic representation.

The proposed method examples utilize an operation to select modified pixels in the original graphic representation by applying a priority matrix such as a halftoning mask via a blue noise mask.

Reference now is made in detail to the examples illustrated in the accompanying drawings and discussed below.

FIG. 2 provides a flow chart of an exemplary embedding process for color and grayscale images including image subdivision and luminance optimization stages.

An example of a system for implementing the described processing will be described in more detail with reference to FIGS. 8-10. In general, process 200 produces an embedded image from an original graphic image representation and an original 2D code. The embedding process 200 involves a graphic representation or image of some form, such as a product, team or company logo, a computer generated graphic, such as a cartoon or character, an image of a real scene, such as a digital image collected by a camera (still or video) or the like. The real scene image may be images of objects, such as bicycles, trains, keys, computers, food, rings, cubes and the like), scenery (e.g., buildings, cityscapes, landscapes, plains, mountains, outer space, underwater, plants, sky, a sunset/sunrise and the like), persons (including animals, plants, insects) or the like. The 2D code may be a maxicode, a QR code, or the like.

At step 210, a computer processor (not shown in this example) obtains the graphic image representation. The computer processor may obtain the graphic image representation from a memory or memory device (e.g., FLASH memory stick) coupled to the computer processor, from a remote server, from a website (with permission of the copyright owner) hosted on a remote server, or the like.

A graphic image is formed of a number (e.g., hundreds of thousands to millions) of picture elements (pixels) having values related to luminance, or any other one dimensional image characteristic value of the image, that are arranged in a two dimensional matrix, such as an M×N or i×j, where M, N, i and j are integers. The graphic image pixels are identified by a location (i, j) in the two dimensional matrix. For example, the matrix may store values for a grayscale version of the graphic image, in which the stored values represent the luminance levels of the graphic image. Luminance is a photometric measure of the luminous intensity per unit area of light traveling in a given direction. Humans perceive luminance as the brightness of the light. For example, the measured luminance of a pixel may be a value between 0 and 255, may be a color image with multiple layers (e.g., Red layer, Green layer, and Blue layer) having pixel values in the range of 0-64512, or may be binary, which only has two values (e.g., 0 or 1). Similarly, the 2D code may also be formed of a number (e.g., approx. 400 to approx. 32,000) of pixels, which is fewer than the number of pixels in the graphic image.

At 220, the computer processor may (e.g., by accessing a memory, or receiving from a remote server) obtain a two dimensional (2D) code. Alternatively, the computer processor may execute a 2D code generation computer application that in response to a user input generates a 2D code containing data that includes a portion or all of the user input. For example, QR code generation computer applications exist that permit a user to generate a QR code containing a uniform resource locator (URL) of a website or the like. Note that the order of steps 210 and 220 is not important, merely the obtaining of the respective graphic image and the 2D code image for the process 200.

While the disclosed techniques and systems are applicable to different 2D codes, the examples described herein focus on the QR code for ease of explanation. There are different versions of QR codes. The difference between the versions of QR codes is primarily based on the capability of one version to store more or less data than another version as well as the level of error correction built into the code. According to the QR code standard, the patterns and structures inside a QR code have well defined functions which include symbol alignment, sampling grid determination and error determination. The sampling grid contains the encoded information. There are three primary patterns and structures, which are the finder patterns, alignment patterns and the timing patterns and their predetermined locations within a code (or particular version of a code), that facilitate decoding of the QR code (or that particular version of the code). Finder patterns are square black and white modules that are several pixels wide, located in three of the four corners of QR code symbol, and facilitate expeditious and successful decoding of the encoded information. The finder patterns are designed to be easily detected from any angle and to facilitate rotating or inverting the code for proper decoding. The alignment patterns are used to determine the sampling grids from which codewords are extracted and are evenly distributed along the code area. The timing patterns consist of one row and one column of alternating black and white QR modules that aid in the determination of the sampling grids. Since these patterns affect the detectability and decodability of the QR code, the modules that comprise these patterns are treated separately from the modules of the sampling grid.

The sampling grid, or encoding region, of the QR code is where the encoded information, i.e., data, as well as parity modules and decoding information is encoded. The encoding region is divided into codewords consisting of 8 QR modules. Two dimensional shapes of these codewords depend on the version of the code and are designed to optimize the coverage area. In addition to the data, information about the version and correcting capability of the symbols is stored next to the finder patterns in order to expedite the decoding and minimize the probability of error in the decoding of the data.

Meanwhile, QR code readers use binary images that result from thresholding the captured gray scale image with local and global thresholds for decoding the encoding information.

Figure 3:
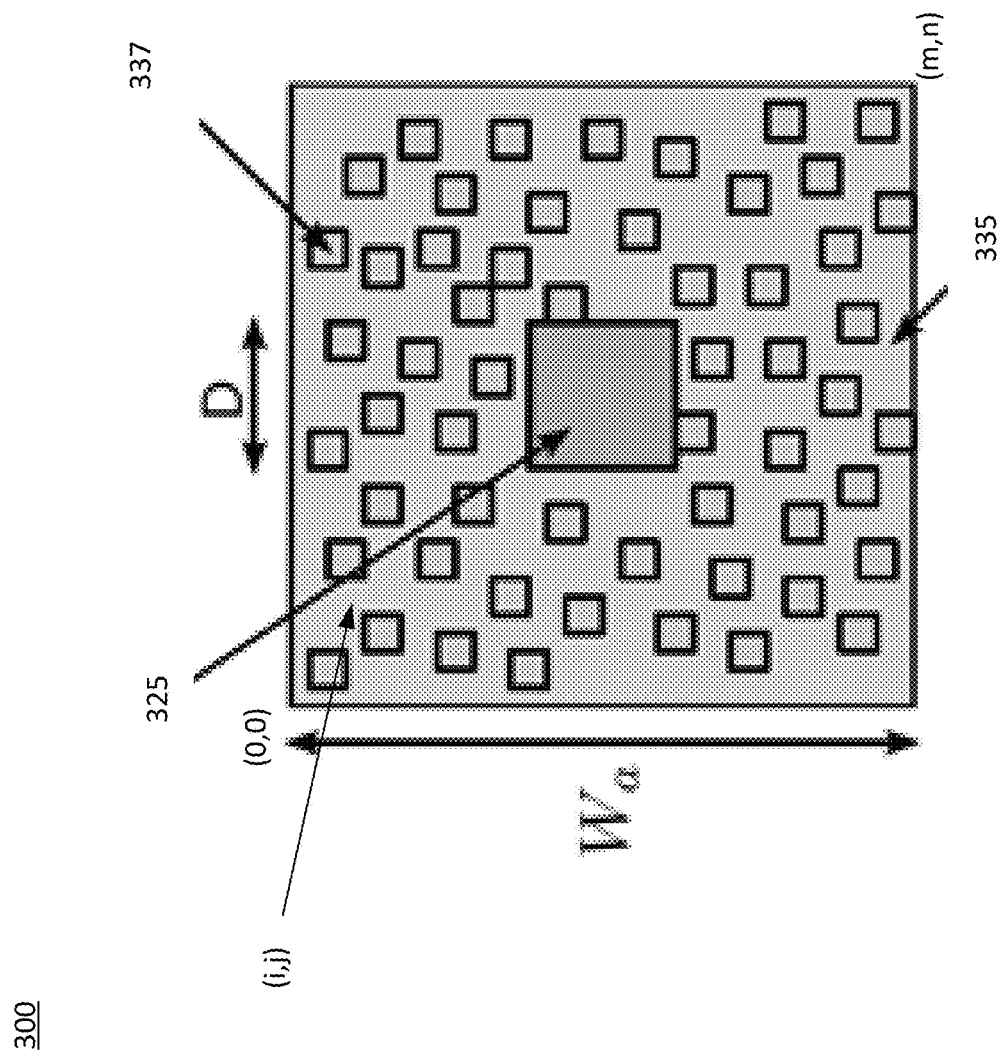
FIG. 3 depicts an exemplary selection of picture elements of a 2D code module for use in providing an embedded image.

Once the graphic image and the QR code image are obtained, the process 200 proceeds to step 230. At step 230, the processor subdivides the graphic image and the 2D code image into subblocks. For example, the graphic image is represented as a matrix with M rows and N columns of pixels, each pixel having a respective value from a range of values and row and column coordinates within the M by N matrix. After the subdividing step, each of the subdivided graphic image subblocks and 2D code image subblocks has m rows and n columns of pixels; where m is less than M and n is less than N. Similarly, the 2D code is subdivided into sub-blocks of m rows and n columns of pixels; where m is less than M and n is less than N. Note that in the example of QR code as the 2D code, a sub block can contain pixels corresponding to many QR code cells or modules. Each subblock of the two dimensional code corresponds to a subblock of the graphic image having an identical pixel row and column coordinates as the two dimensional code sub-block. In other words, the graphic image and the QR code image may be represented, for example, by a 100 (M) by 100 (N) matrix of pixels, and be subdivided into subblocks of 10 (m) by 10 (n) pixels. As shown in the example of FIG. 3, the top left corner of the 100 by 100 pixel matrix will be location (0,0), while the bottom right location is (m, n), or in the case of our example (10,10). In this case the sub-block contains pixels corresponding to one QR code cell or module. Each element of the subblock starting from the origin (0,0) may have pixel values (0,0) to (10,10) (shown as (i,j) in FIG. 3). Since the pixel locations in both the 2D code image and the graphic image are mapped to a common coordinate matrix, a corresponding pixel location in the 2D code image (e.g., (i, j)) refers to the same pixel location in the graphic image (e.g., (i, j)), and vice versa.

Returning back to FIG. 2, at step 240, the processor identifies pixels in the graphic image suitable for luminance modification based on the obtained QR code image.

For example, since the graphic image may have a large number of pixels, the processor may operate on a subset of pixels in the graphic image to more quickly process the graphic image. For example, the identification of pixels suitable for luminance modification is performed on a subset of the pixels that form the graphic image. The identification of pixels may be performed by applying a filter, or mask, to the pixels of the graphic image. The filter is usually in the form of a window or block (i.e., a m×n matrix, where m and n are integers and may or may not be equal) having values at each of the (m, n) locations in the mask. The values at each of the respective locations may be selected, such that the pixels of the graphic image that are more suitable for luminance modification than other pixels in the graphic image are identified. For example, the processor may align the mask to be placed over the pixels in a corner, such as the top left corner, of the graphic image representation. In this case, the optimization of the luminance of modified pixels is performed on a subdivision of the original graphic representation in smaller blocks of pixels "covered" by the mask. When the processor is processing the graphic image, the original graphic representation, the QR matrix code image, a halftoning mask and, depending upon the implementation, additional saliency mask images are subdivided in smaller image blocks for processing.

Alternatively, the suitable pixels may be identified in a pseudo-random fashion or according to a predetermined ordering that is stored in a data storage. For example, the processor may simply retrieve the predetermined ordering from the data storage, and locate pixels in the subblock being evaluated that correspond to the predetermined ordering.

The graphic image is subdivided into a number of overlapping subblocks, but the pixels corresponding to each cell or module of the QR code are non-overlapping. Two masks (also referred to as windows) are applied to each of the number of overlapping subblocks of the subdivided graphic image. A first mask determines central pixels and a second mask determines pixels, other than central pixels that are suitable for modification. The results of the application of the first and second mask to the number of non-overlapping subblocks of the QR code image are stored in memory. Referring again to FIG. 3, it illustrates an example of an image block 300 after application of both filters. The image block may have a width and height equal to $W_a$ pixels, where $W_a$ is a integer. The central pixels 325 are determined by identifying pixels within a region of contiguous pixels around a corresponding center pixel of each block of image pixels 300. The number of pixels selected depends upon the input parameter D in an arbitrary way. The input parameter D may include but is not limited to a circular region of diameter D pixels or a square region with D pixels in each side. For example, the input parameter D may indicate that a matrix having dimensions $d_a \times d_a$ be selected, where $d_a$ is an integer that is arbitrarily selected, or selected based on a characteristic, such as the image resolution, location for presentation of the embedded image (i.e., billboard, magazine add, or video display).

The second filter, or mask, may be called a priority mask. In some examples, the priority mask is a blue noise mask. Blue noise masks have been used in halftoning to improve the quality of the printed halftone image. A blue noise mask may be a matrix of values that are applied to an images data (e.g., luminance) values, and when applied to the image data produces resulting image data with negligible low frequency components. In the human visualization system, high frequency image data is more perceptible as opposed to low frequency image data. In the case of halftoning, the high frequency image data are the portions of the image that provide the details, such as edges, while low frequency image data are the smoother transitions or variations in an image. The use of the blue noise mask provides an equidistant set of points within an image when the threshold is a constant grayscale value. Other suitable types of methods and masking techniques known in the art may also be used as, or in place of, the priority mask, such as, for example, void and cluster method, direct binary search (DBS) method, green noise mask design methods, blue noise methods, multitone dithering method, techniques based on centroidal voronoi tessellations, clustered dot masks, or any other halftoning method.

Similarly, the QR code image is subdivided into a number of non-overlapping subblocks. The first and second filters are also applied to the number of non-overlapping subblocks of the QR code image. The results of the application of the first and second filters to the number of non-overlapping subblocks of the QR code image are stored in memory.

The application of the priority mask as described above may produce an image block as shown in FIG. 3. Said differently, a window extraction function may apply a priority mask that extracts a window in which the concentration of pixels surrounding identified center pixels that may be modified is denoted by the parameter $p_c$ for each sub block of the original graphic representation and uniquely defines the number and location of pixels suitable for modification. For example, the graphic image representation (not shown) may be represented as a matrix of pixels with the matrix having a size of M rows by N columns (i.e., M×N), where M and N are integers. An example of a size of a graphic image representation may be 1024 rows by 768 columns (i.e., 1024×768) of pixels. This is an example of an image found on an Internet web page, other examples of web page image sizes include 460×309, 160×108, 75×75, 240×240, 500×334. Meanwhile, printed materials such as magazine and newspaper images (e.g., pictures, graphics and the like) may be measured in pixels per inch (ppi), which may be translated then to dots per inch (dpi) for the respective printers used to generate the printed material. Note that magazine print is of a higher quality than newspaper print, so the ppi and dpi may be different as may the printing processes. However, both processes may utilize a blue noise mask or other technique to improve the visual quality of the printed material.

The priority mask may be M×N pixels. The priority mask is applied to the image pixels 335 of the image subblock 300 and identifies pixels suitable for luminance modification 337 in the graphic image representation. The results of the priority mask are an identification of image pixels 337 that are suitable for luminance modification (referred to herein after as "suitable pixels").

In this example, the selection of suitable pixels is based on the use of a priority matrix such as a halftoning mask to generate the sensation of a smooth blending between the code and the image. The suitable pixels 337 may be selected based on a luminance value thresholding technique in which the halftoning mask, for example, may contain elements having values between 0 and 255 distributed in a pseudo-random fashion, and when the priority mask is applied for purposes of thresholding with an appropriate concentration of pixels (e.g., 127 pixels), then approximately half of the pixels have a value of zero (0) and the other half of pixels will have a value of one (1), and the distribution of pixels in the masked area will be substantially uniform. A single thresholding value may be selected based on the desired output.

The selection of the type of halftoning mask to be used to determine pixels suitable for modification is determined by either aesthetic reasons to simulate a particular texture or by technical reason to improve the robustness with respect to dot gain distortions introduced by the printing technology.

In FIG. 3, the center pixels of the region corresponding to a QR code cell (or module) in the QR code cells are chosen based on the arbitrary dimension of D which specifies the size of the center region in each cell of the QR matrix code, and another parameter $P_{max}$ which specifies the maximum probability of error in the decoded message.

The priority mask reduces the visual impact of the embedding and minimizes the visual perception of the constituent cells of the QR code.

For example, the concentration of surrounding pixels suitable for modification 337 is denoted by the parameter $p_c$ for each image subblock 300 of the original graphic image representation and uniquely defines the number and location of suitable pixels 337 as depicted in FIG. 3. The exact location of suitable pixels 337 is obtained by the priority mask such as by thresholding a blue noise halftoning mask with the concentration $p_c$ of suitable pixels. The result of step 240 is the identification of the center pixels 325 and the locations of suitable pixels 337 for luminance modification.

The processor, upon the identification of the suitable pixels may store the set of center pixels locations and the locations of the suitable pixels in memory for each respective subset of pixels (also referred to as block or window) from the respective graphic image representation and the QR code image. This is referred to window extraction and each stored set of center pixel locations and suitable pixels may be referred to as a window.

After selecting center pixels and identifying the suitable pixels using the halftoning mask, a character pixel value, such as luminance or intensity, of the selected center pixels and identified suitable pixels are modified at 260. However, prior to modifying the luminance values, the modified luminance values are determined based on a probability of error model selected at 250.

At 250, the ability of the embedded QR code to be successfully detected based on the graphic image data is determined by the processor. The selection of the probability detection model may be based on a number of factors including environmental factors, such as environmental exposure, rain, snow, and the like, in which the modified image may be displayed or presented. Other factors that may affect probability of detection may include paper quality, printing quality, printing material, quality of the scanning by a scanning device or camera, scanner or camera quality, complexity/sophistication of decoder application, lighting conditions, location, such as indoors or in open outdoor space, and the like.

The processor may also use the original luminance values, such as average luminance or the like, of the original graphic image representation and the original QR code, the environment factors (i.e., indoors, outdoors, lighted, size, such as billboard or poster, in which the embedded image will be presented to users, the presentation media, which may be either print media or electronic display media, and the weather, and other factors, selects a probability of error model. The probability of error model also accounts for a number of different error parameters, such as binarization errors, detectability errors, decoding errors and the like.

Based on the selected probability of error models, the luminance values of the center pixels and the values are optimized independently for each subblock in the graphic image, and the optimal luminance values are determined by minimizing the visual image distortion while keeping the probability of binarization error below a predefined threshold. Binarization is the process of choosing whether a particular pixel value will be a one (1) or a zero (0) based on the particular pixel's luminance value. Since the disclosed embedding process modifies luminance values that would be used to decode the QR code, the binarization thresholds applied to the original black and white QR code may be distorted. In other words, pixels that may have been black (e.g., 1) in the original QR code may now be white (e.g., 0), or vice versa. As a result of the embedding process, the probability of a binarization error increases as does the probability of decoding errors. The processor determines for each subblock of the embedded image optimal luminance values for the selected center pixels 325 and identified suitable pixels 337 by minimizing the visual image distortion while keeping the probability of binarization error below a predefined threshold. For example, the visual image distortion may be minimized using different types of functions related to low frequency and high frequency characteristics of the embedded image. More specifically, the visual image distortion may be minimized using a combination of mean square error and structural similarity index techniques. The output of step 240 is optimized luminance values that are optimized independently for each block in the embedded image.

To ensure that the embedded image is decodable by a target decoder, a probability of error model is selected to impose a constraint over the optimization of the luminance parameters. The following example utilizes a specific probability error model, but any probability error model that adequately predicts the probability of decoding error may also be used. The following example of a probability error model has two components. A first component corresponding to the case of sampling the center region of the QR modules and a second component corresponding to the sampling outside the center. The first component is denoted by $P_{Derr}(\alpha, \beta, \alpha_c, \beta_c, p_c)$ for the case of color and gray scale graphic images and by $P_{Derr}(\alpha_0, \beta_0, \alpha_1, \beta_1, \alpha_c, \beta_c)$ for the case of binary images. The second component is denoted as $P_{Berr}(\alpha, \beta, \alpha_c, \beta_c, p_c)$ for color and grayscale images and as $P_{Berr}(\alpha_0, \beta_0, \alpha_1, \beta_1, \alpha_c, \beta_c)$ for binary images.

The model for the probability of binarization error $P_{Berr}$ depends on the procedure implemented at the decoder to binarize the grayscale embedded image acquired by the camera. An example of such a model is derived by considering that the decoder binarizes the image using a local thresholding technique where the threshold is calculated as the mean value of the image intensity in a local window $$t[m, n] = \frac{1}{N} \sum_{(i,j) \in W} Y_{i,j}. \qquad \text{Eq (1)}$$

where $Y_{i,j}$ is the original image luminance value at a pixel location (i,j), t is a local threshold, m is row location of the pixel, and n is column location of the pixel, and N is the number of pixels in a window $W_a \times W_a$ (of FIG. 3). In another example, N may have other values as well.

The probability of error model is then calculated by considering the probabilities that a particular element is classified as the opposite of its correct value in the QR code:

$$P_{Berr} = P(Y_{i,j}^{out} < t[m,n] | q_{i,j}=0) P(q_{i,j}=0) + P(Y_{i,j}^{out} > t[m,n] | q_{i,j}=1) P(q_{i,j}=1) \qquad \text{Eq (2)}.$$

where $Y_{i,j}^{out}$ is the output luminance of a pixel at location (i,j) of the embedded image.

Other models are also possible considering different binarization methods or an example of methods in such a way the model approximates the response of a set of different decoders.

The global probability of error $P_{err}$ is finally calculated based on the probability of sampling error $p_s$ as $$P_{err} = P_{Derr}(1-p_s) + p_s P_{Berr} \qquad \text{Eq (3)}.$$

As part of step 260, prior to the actual modification of the pixel characteristic values, or in our example, luminance values, the luminance value parameters of the identified pixels are optimized based on the global probability of error $P_{err}$. The optimization of the luminance of the embedding is performed such that the probability of error is below a predefined threshold. In other words, $P_{err}$ is less than, for example, approximately 0.2 or less, where ≈0.2 or less is the predefined threshold. A typical predefined threshold value is 0.15. Of course, other predefined thresholds, or ranges of predefined thresholds, may be selected. In some example, the resolution of the camera and the scanning distance are reflected in the model for the probability of error, however since we assume that the probability is calculated as the average of several pixels this has less importance in practice The optimization of the embedding parameters $\alpha$, $\beta$, $\alpha_c$, $\beta_c$ and $p_c$ pursue two conflicting objectives which are the minimization of the probability of error and the maximization of the embedding visual quality. To quantify the embedding quality, a cost function which considers the distance between the embedded image and the original image based on the response of the human visual system is defined. The example cost function is denoted by $J(\alpha, \beta, \alpha_c, \beta_c, p_c)$ and is a function of the embedding parameters $\alpha$, $\beta$, $\alpha_c$, $\beta_c$ and $p_c$, the original image and the QR code. The objective function (seeking to maximize visual quality) accounts for the human visual system h, which is included as a parameter as shown below:

$$J(\alpha, \beta, \alpha_c, \beta_c, p_c) = F(\alpha, \beta, \alpha_c, \beta_c, p_c; h) \qquad \text{Eq (4)}.$$

An example of a human visual system model may be the following:

$$h[m, n] = \frac{k}{2\pi} \frac{1}{\left(\frac{k}{2\pi} + \left(\frac{180m}{\pi RD}\right)^2 + \left(\frac{180n}{\pi RD}\right)^2\right)^{3/2}}. \qquad \text{Eq (5)}$$

where k is a parameter determined by fitting experimental data, R is the printing or screen resolution in dots/inch, and D is the viewing distance in inches. Note that the distance D is the distance to the observer, not to the camera that is taking the picture, since we are optimizing for improved perception. The camera may in general be located closer to the code than distance D. In addition, the resolution R is also related to the printing resolution or the resolution of the screen in which the image is being displayed, not the resolution of the camera. In some examples, the resolution of the camera and the scanning distance may be reflected in the model for the probability of error. Of course, other examples of a human visual system model may be used.

Different linear and non-linear objective functions F may be defined depending on the viewing distance, the printing resolution and the quality criteria most appropriate for the application at hand. An example of an objective function F is the filtered mean square error between the intensity values of the embedded image and the original image shown in equation Eq (6):

$$F = \frac{1}{N}\|h*(Y^{out} - Y)\|. \quad \text{Eq (6)}$$

Another example of an objective function F is the combination of the filtered mean square error and the mean Structural Similarity Metric (MSSIM), such as $$F = \frac{1}{2}(1 - MSSIM(Y^{out}, Y)) + \frac{1}{N}\|h*(Y^{out} - Y)\|. \quad \text{Eq (7)}$$

A final example of an objective function F is mean squared error can be calculated between the intensities of the embedded image $L^{out}$ and original image L in a uniform color space:

$$F = \frac{1}{2}(1 - MSSIM(Y^{out}, Y)) + \frac{1}{N}\|h*(L^{out} - L)\| \quad \text{Eq (8)}$$

Figure 5:
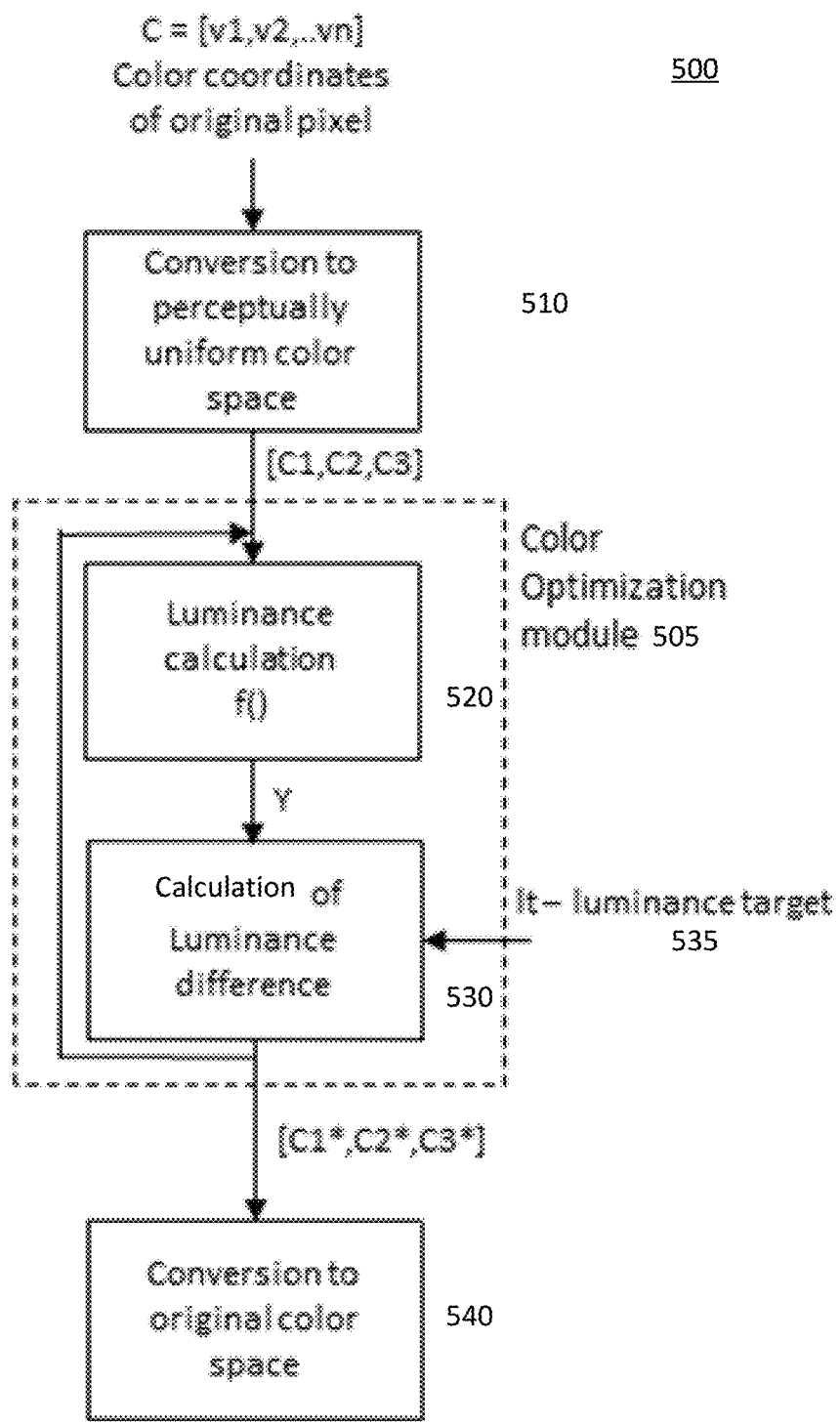
FIG. 5 provides a functional process flow example of a color optimization for generating a color embedded image.

Using one of the above objective functions, the optimal embedding parameters $\alpha_c$, $\beta_c$, $\alpha$, $\beta$, $p_c$ are then found as the solution of the optimization:

$$(\alpha_c^*, \beta_c^*, \alpha^*, \beta^*, p_c^*) = \min_{\alpha, \beta, \alpha_c, \beta_c, p_c} J(\alpha_c, \beta_c, \alpha, \beta, p_c) \quad \text{Eq (9)}$$

subject to $P_{err}(\alpha_c, \beta_c, \alpha, \beta, p_c) \leq P_{max}$ where $P_{err}$ is a model for the probability of error in the QR detector and $P_{max}$ is the maximum allowed probability for a correct decoding of the QR code in the embedded image. FIG. 5 presents a graphic diagram of the optimization process.

Another example of a method that can be used to solve this optimization problem is the logarithmic barrier method. In general, any method that allows to optimize a non-linear function subject to non-linear constraints can be used. Since the central goal is to keep the probability of error constraint under a specified limit to ensure decodability, there are multiple solutions depending on the method used which are equally valid.

The quality and reliability of the optimization solutions is determined by the parameter $P_{max}$ which in addition to the size of center cluster $d_a \times d_a$, or D as shown in FIG. 3, may, for example, be the only parameters controlled by the user (an example of a user interaction will be described in more detail below). Alternatively or in addition, other parameters, such as the average scanning distance, the assumed noise level in the QR reader, the printing resolution in the case in which the embedding is printed, or the dot size in the case the QR code is displayed in an LCD panel or other monitor, or the like. A reliability parameter may also be applied to manipulate the robustness of the embedding process.

For a given set of center and surrounding modified pixels their luminance levels are changed in such a way that the visual similarity between the embedding and the original image is minimized. The luminance values as well as the concentration of modified pixels $p_c$ is optimized independently for each sub block of the image, and the optimal values are determined by minimizing the visual image distortion while keeping the probability of decoding error below a predefined threshold. The luminance of the pixels in the embedded image $Y_{i,j}^{out}$ at location (i, j) is selected as a function of the QR code image pixel values $q_{i,j}$ and the luminance of the original graphic representation $Y_{i,j}$. The output luminance is given by Eq. (10):

$$Y_{i,j}^{out} = \begin{cases} \beta & \text{if } (i, j) \text{ is modified and } q_{i,j} = 1 \\ \alpha & \text{if } (i, j) \text{ is modified and } q_{i,j} = 0 \\ \beta_c & \text{if } (i, j) \text{ is a center pixel and } q_{i,j} = 1 \\ \alpha_c & \text{if } (i, j) \text{ is a center pixel and } q_{i,j} = 0 \\ Y_{i,j} & \text{otherwise} \end{cases} \quad \text{Eq. (10)}$$

where $\alpha_c$, $\beta_c$, $\alpha$, $\beta \in [0,1]$ are parameters optimized independently for each block. As mentioned above, the modification parameters are defined from the luminance of the original graphic image. The foregoing discussion applies to both grayscale and color luminance values. However, in the case of color images, there is an additional step needed to define the optimal color.

At 260, based on the optimization that used the probability of detection model selected in 250, the processor modifies pixel values (e.g., luminance) values of the suitable pixels in the respective subblocks of the subdivided graphic image. In an example, the modified pixel values are stored in memory accessible by the processor (not shown in this example).

The modified pixel values are used, at step 270, by the processor to replace pixel values in the 2D code subblocks. For example, for each subblock of the 2D code, the modified pixel value in the identical pixel row and column coordinates from the graphic image subblock is used by the processor to replace a pixel value in the 2D code subblock.

Figure 4:
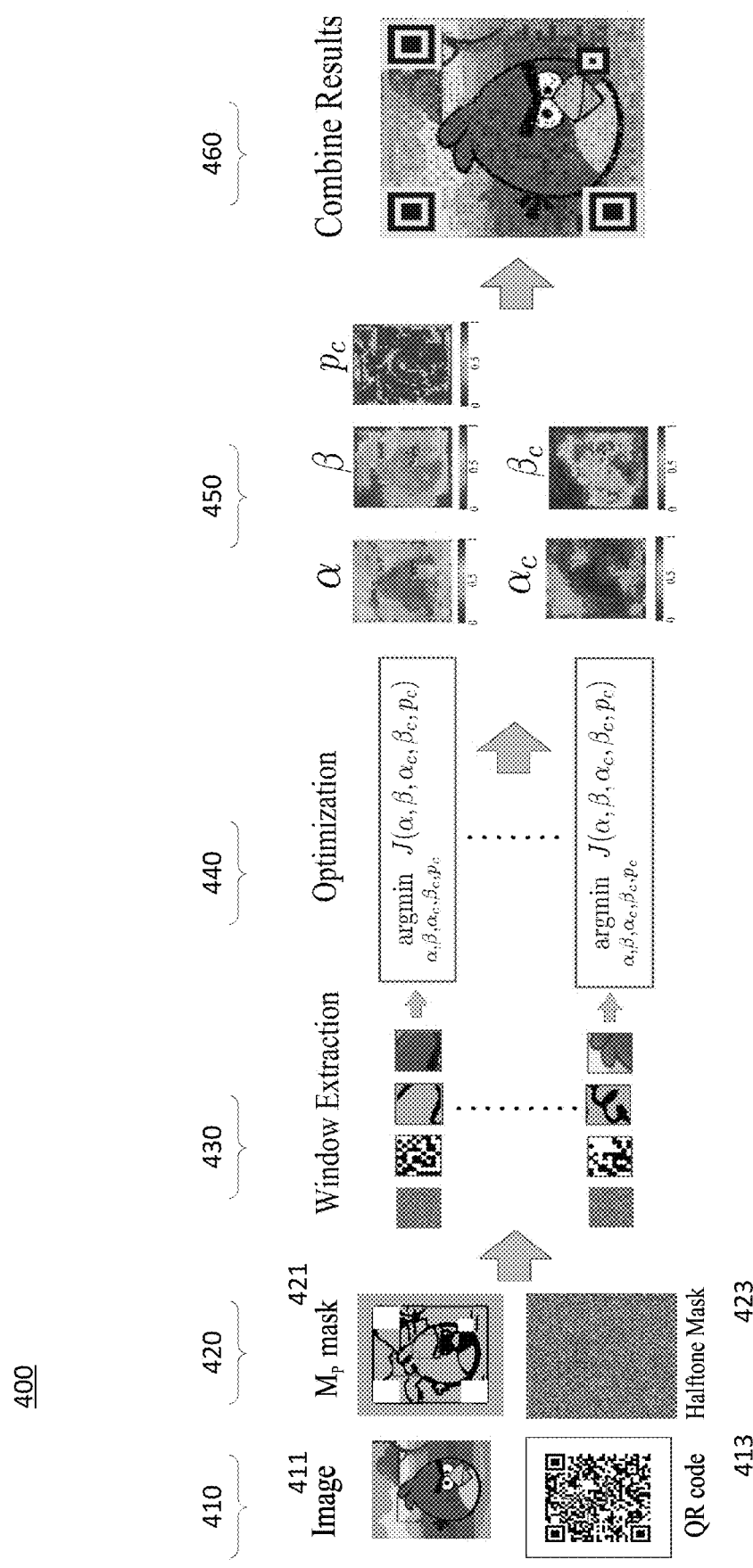
FIG. 4 illustrates a graphical depiction of the exemplary process operations illustrated in FIG. 2.

While the flow chart of FIG. 2 provides a depiction of the process flow, FIG. 4 provides a graphical example of the embedding process illustrated in FIG. 2 for the case of color and grayscale embedded images. The color/grayscale graphical example 400 including the image subdivision, and luminance optimization stages. The different stages of the QR embedding procedure are illustrated. For example, at 410, the inputs to the process are the original color/grayscale graphic image 411, and the QR code 413. At 420, the inputted original image 411 and QR code 413 are processed by the processor using a halftone mask 423 and the masks (represented by $M_p$ mask 421) used for image prioritization and global value of $P_{max}$ and $d_a$. Recall that $d_a$ is the dimension of the center pixel selection window and $P_{max}$ is the concentration of pixels that is used in the identification of suitable pixels for luminance modification from the image pixels. The original graphic image 411 and QR code 413 are divided in local windows at 430. The local windows are optimized, at 440, independently and in parallel. The optimization at 440 provides windows optimized for the different optimization parameters $\alpha$, $\beta$, $\alpha_c$, $\beta_c$, and $p_c$. The results of the optimization are combined to form an embedded image 460. The combining may be an interpolation of the optimization results illustrated $\alpha$, $\beta$, $\alpha_c$, $\beta_c$, and $p_c$.

The process of FIG. 3 is also applicable to binary graphic image representations, but with modification of certain steps. In the case of binary images, step 230 results in the identification of suitable pixels 337 that are identified according to their position in the QR code block and the pixel values of the graphic image representation. The center pixels correspond to each QR module of size D. In addition, the luminance values are optimized such that two different optimization parameters $\alpha_c$ and $\beta_c$ are assigned according the values of the QR module. As a result, a fixed set of values is used to modify the respective luminance values as shown in the example of FIG. 6. Of course, a number of different luminance values may be used based on the respective factors discussed with respect to the environmental factors considered in the optimization.

In the example of a color graphic image representation, the luminance values of the respective colors in the color space are also optimized. In particular, the color of the embedded image is obtained by minimizing the color distance in an appropriate color space subject to a constraint in the luminance value which should equal the modified luminance $Y_{i,j}^{out}$ However, an ambiguity may be generated given by the fact that each luminance level corresponds to many different colors in the color space in which the color graphic image representation was designed (i.e., red-green-blue (RGB), cyan-magenta-yellow-black (CMYK), cyan-magenta-yellow (CMY) or in general any color space of the printed matter).

FIG. 5 illustrates a functional block diagram optimizing the luminance values of the respective colors in a color space of an embedded image. The process 500 is implemented via a color optimization module 505. The color optimization module 505 may be implemented via computer program instructions stored in a memory that are executed on a processor (not shown, but described in more detail with respect to FIGS. 7 and 8). Alternatively, the process 500 may be implemented in hardware, such as an application specific integrated chip, or other programmable device.

An initial input into the process 500 is the color coordinates of the original pixel in the original color graphic image representation, e.g., C=[v1, v2, . . . vn], where v1, v2, . . . vn, are individual color space parameter values in a particular space of the original color graphic image representation. To obtain the optimal color coordinate vector $v=(v_1, v_2 \ldots v_n)$ in the original color space (of the original color graphic image representation) for a given luminance target $l_t$, the original color coordinate vector v is transformed into a perceptually uniform color space such as, but not limited, to hue-saturation-luminance (HSL), Luv color space or Lab color space (510). Each of the uniform color space components in this space are denoted as $(C_1, C_2, C_3)$ in general is input into the color optimization module 505 for optimization.

The relationship between the luminance Y and the components $(C_1, C_2, C_3)$ is given by:

$$Y = f(C_1, C_2, C_3) = g(T^{-1}(C_1, C_2, C_3)) \quad \text{Eq (11)}$$

where $T^{-1}(C_1, C_2, C_3)$ is the backward transformation from the uniform color space to the original color space, $f$ is a function for calculating luminance in the uniform color space, and g is a function that facilitates the calculation of luminance values from the coordinates in the original color space. At 520, the luminance Y of the respective pixels in the uniform color space is determined via the function $f$. The target luminance $l_t$ 535 is also an input to the color optimization module 505. The target luminance $l_t$ 535 may be a single value for all colors (or color space parameters) in the color space. The target luminance $l_t$ 535 may be based on, for example, a probability error model as discussed above with respect to FIGS. 2-4. At 530, the luminance difference between the target luminance $l_t$ 535 and the luminance Y calculated at 520 is calculated using an optimization equation. The optimal values in the perceptually uniform space are obtained from $$(C_1^*, C_2^*, C_3^*) = \underset{C_1, C_2, C_3}{\operatorname{argmin}} |F(C_1, C_2, C_3) - l_t|. \quad \text{Eq (12)}$$

The steps 520 and 530 are recursive and are satisfied when the minimum values (which are also the optimal values) $(C_1^*, C_2^*, C_3^*)$ of color space components are determined. Once the optimal $(C_1^*, C_2^*, C_3^*)$ color space components are determined, the color optimization module 505 returns the optimal $(C_1^*, C_2^*, C_3^*)$ of color space components to the processor for further processing. The processor receives the optimal $(C_1^*, C_2^*, C_3^*)$ of color space components and calculates new coordinates in the original color space using the forward transformation T between the uniform space and original space, such as, for example, $(v_1, v_2, \ldots, v_n) = T(C_1^*, C_2^*, C_3^*)$.

The target luminance $l_t$ 535 used in the color optimization corresponds to the modified luminance $Y_{i,j}^{out}$ obtained from the luminance optimization process described above with respect to FIGS. 2 and 3.

The optimization of local luminance levels in the case of binary graphic image representations is different from the optimization of local color luminance levels in the case of color or grayscale images. The process 200 of FIG. 2 also applies to binary graphic image representations, but with some modification of steps 230-250.

In the case of binary graphic image representations, the luminance parameters $\alpha_c, \beta_c, \alpha_0, \beta_0, \alpha_1, \beta_1$ are different than those used for a color/grayscale graphic image representation discussed above. The binary graphic image luminance parameters $\alpha_c, \beta_c, \alpha_0, \beta_0, \alpha_1, \beta_1$ are optimized based on a cost function that calculates a distortion metric corresponding to the distortion of the embedded image with respect to the original image and is a function of the luminance parameters, the binary image and the QR code denoted as $J(\alpha_c, \beta_c, \alpha_0, \beta_0, \alpha_1, \beta_1)$. Similar to the optimization of color/grayscale luminance optimization, the calculation of the distortion metric also considers a model of the human visual system h that is included in the cost function $J(\alpha_c, \beta_c, \alpha_0, \beta_0, \alpha_1, \beta_1) = F(\alpha_c, \beta_c, \alpha_0, \beta_0, \alpha_1, \beta_1; h)$, where F is an objective function. Different linear and non-linear objective functions F can be defined depending on the viewing distance, the printing resolution of the media on which the embedded binary image is to be presented, quality criteria and/or the like.

The solution of the optimization problem below provides the optimal optimization parameters in the case of a binary graphic image representation:

$$(\alpha_c^*, \beta_c^*, \alpha_0^*, \beta_0^*, \alpha_1^*, \beta_1^*) = \quad \text{Eq (13)}$$
$$\min_{\alpha_c, \beta_c, \alpha_0, \beta_0, \alpha_1, \beta_1} J(\alpha_c, \beta_c, \alpha_0, \beta_0, \alpha_1, \beta_1)$$
$$\text{subject to } P_{err}(\alpha_c, \beta_c, \alpha_0, \beta_0, \alpha_1, \beta_1) \le P_{max}.$$

Returning to step 250 at FIG. 2 to explain the changes to step 250 in the process 200 when a binary graphic image is used, the processor modifies binary luminance values of the suitable pixels in the binary graphic image representation depending on its value in the binary graphic image $I_{(i,j)}$. The luminance of the embedded binary image is given by:

$$Y_{i,j}^{out} = \begin{cases} \beta_0 & \text{if } I_{i,j} = 0, (i,j) \text{ is a not center pixel and } q_{i,j} = 1 \\ \alpha_0 & \text{if } I_{i,j} = 0, (i,j) \text{ is a not center pixel and } q_{i,j} = 0 \\ \beta_1 & \text{if } I_{i,j} = 1, (i,j) \text{ is a not center pixel and } q_{i,j} = 1 \\ \alpha_1 & \text{if } I_{i,j} = 1, (i,j) \text{ is a not center pixel and } q_{i,j} = 0 \\ \beta_c & \text{if } (i,j) \text{ is a center pixel and } q_{i,j} = 1 \\ \alpha_c & \text{if } (i,j) \text{ is a center pixel and } q_{i,j} = 0 \end{cases} \quad \text{Eq (14)}$$

Where $\alpha_0$, $\beta_0$, $\alpha_1$, $\beta_1$, $\alpha_c$, $\beta_c$ are six independent luminance parameters between 0 and 1 that correspond to all the possible combinations of values from the image and the QR code as depicted in FIG. 6.

While the process of FIG. 2 provides a depiction of the process flow that is applicable to both color/grayscale graphic image representations and binary graphic image representations, FIG. 6 provides a graphical example of the FIG. 2 embedding process for the case of binary embedded images. The graphical example 600 including the image subdivision, and luminance optimization stages. The different stages of the QR embedding procedure are illustrated. For example, at 610, the inputs to the process are the original binary graphic image 611, and the QR code 613. At 620, the inputted original image 611 and QR code 613 are processed by the processor using a halftone mask and the masks used for image prioritization and global value of $P_{max}$ and $d_q$. Recall that $d_q$ is the dimension of the center pixel selection window and $P_{max}$ is the concentration of pixels that is used in the identification of suitable pixels for luminance modification from the image pixels. The original graphic image 611 and QR code 613 are divided in local windows at 630. The local windows are optimized, at 640, independently and in parallel. The optimization at 640 provides windows optimized for the different optimization parameters $\alpha_0$, $\beta_0$, $\alpha_1$, $\beta_1$, $\alpha_c$, and $\beta_c$. The results of the optimization are combined to form an embedded image 650. The combining may be an interpolation of the optimization results illustrated $\alpha$, $\beta$, $\alpha_c$, $\beta_c$, and $p_c$. Said differently, the optimal luminance parameters are interpolated to every pixel that are subsequently used to regenerate the embedded image.

An example of the application luminance parameters optimized via optimization 640 of FIG. 6 and as illustrated in Eq (14) is illustrated in FIG. 7A. FIG. 7A illustrates an example of binary luminance modification based on the examples described with respect to FIGS. 2 and 6. In FIG. 7A, the original image window 710 is a window, or block, of the inputted binary graphic image representation as discussed with respect to step 210 of FIG. 2 and 630 of FIG. 6. After a processor processes the data in the original image window 710, the processor optimizes the binary luminance parameters, the luminance values of the original image window 710 are modified. The modified luminance values are indicated by the respective binary luminance parameters $\alpha_0$, $\beta_0$, $\alpha_1$, $\beta_1$, $\alpha_c$, and $\beta_c$ in modified luminance window 720.

FIG. 7B illustrates an example of an embedded image generated based on the examples described with respect to FIGS. 2 and 6. As can be seen, A) in FIG. 7B illustrates an example of a binary image embedded within a QR code generated using the above described processes and systems. The example B) in FIG. 7B is an example of a scene modified according to the above described processes and systems. Note that example B) of FIG. 7B is an improvement over the prior results shown in FIG. 1 *b*). Example C) in FIG. 7B is an example of high quality photograph manipulated according to the examples described herein.

FIGS. 4, 6 and 7B include examples of an embedded image (i.e., combined results) of QR code reproduction. The exemplary reproductions of a QR code with visual image information may be implemented on a substrate bearing the visual appearance of a QR Code. The QR code reproduction may be characterized by an ordered grid of binary (or color space) values, interposed by contone-intensity values of which a subset of values have been altered to minimize the visual appearance of binary QR code values, such as 413 in FIG. 4 or 613 of FIG. 6. The reproduction may be a printed image, such as advertisement, billboard, postcard, or the like, or a digital image on an active display device. Examples of an active display device (discussed in more detail with reference to FIGS. 8-10) is an LCD panel, LCD projector, DLP projector, OLED display, CRT monitor, plasma display or the like. The results illustrated in FIGS. 4, 6 and 7B show the improved results in aesthetics provided by the disclosed examples as opposed to the prior results illustrated in FIG. 1.

Figure 8:
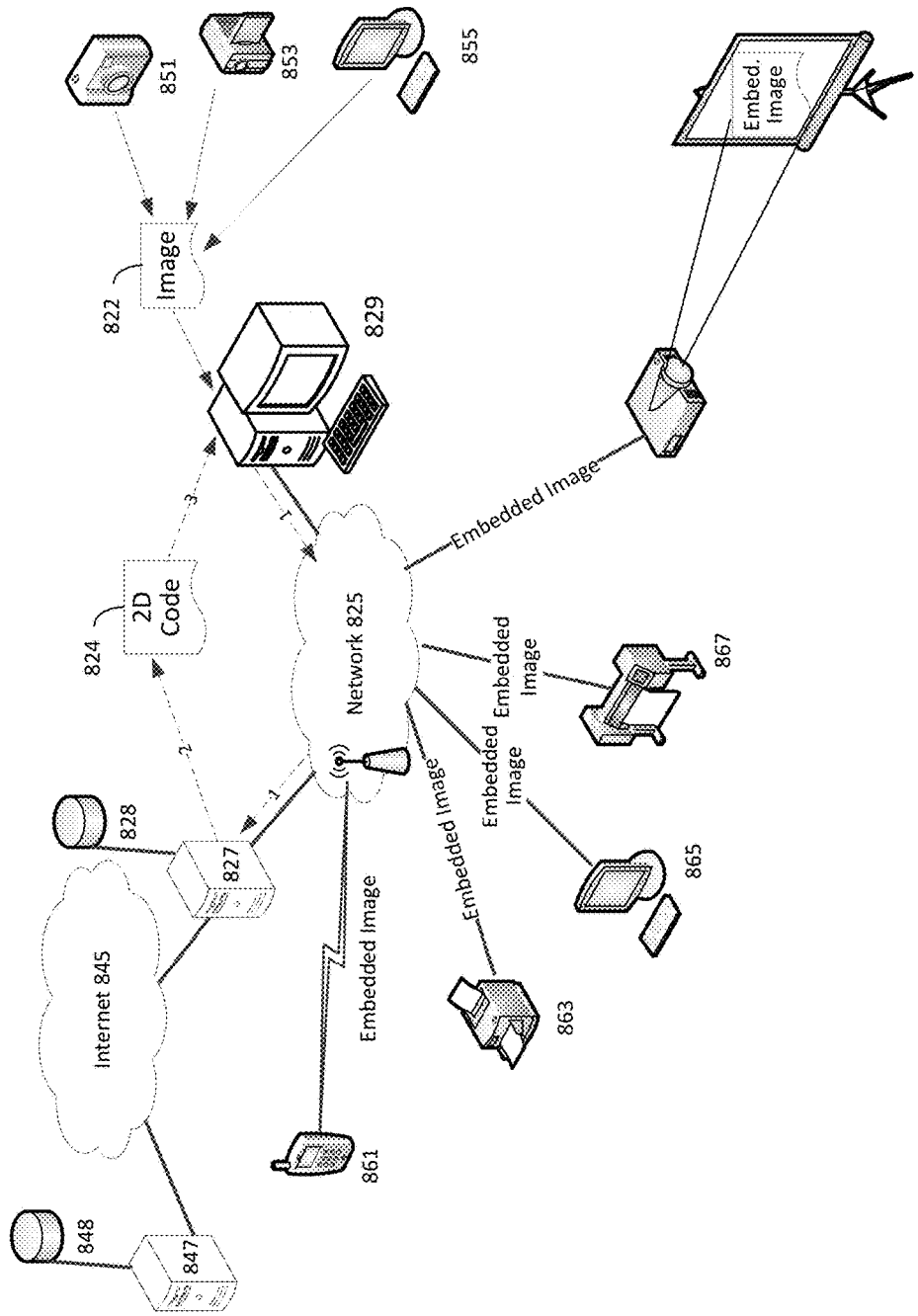
FIG. 8 illustrates an example of a system environment in which the above disclosed examples may be implemented.

FIG. 8 illustrates an example of a system environment in which the above disclosed examples may be implemented. The system environment 800 may include a user system 829, a network 825, a number of peripheral devices 861-869, a network server 827, a network data storage 828, a number of input devices 851-853, a data network 845, such as the Internet, a data network server 847, and a data network data storage 848. The user system 829 includes a processor (which is described in more detail with reference to FIGS. 9 and 10) and memory for storing data and computer program instructions related to the above described examples of generating an embedded image.

In an example described with reference to FIG. 2, the graphic image representation 822 may be obtained (as in step 210 of FIG. 2) from one or more of the input devices 851-855, such as a digital camera 851, a video camera 853, a computer system 855, a scanning device (not shown), or any other device that is capable of providing a digital graphic image representation.

The user system 829 may receive the 2D code 824 (as in step 220 of FIG. 2) from one or more sources. For example, the 2D code 824 may be stored in data storage 828, which is accessible by the user system 829 via the network 825 and network server 827. Alternatively, the 2D code 824 may be stored in the memory (not shown in this example) of the user system 829. In another alternative, a user may input a message that the user wishes to have encoded in a 2D code. A computer application that generates a 2D code based on an input message may execute on the user system 829 to provide a 2D code for generation of the embedded image. Similarly, as shown by the dashed lines, the user system 829 may receive the message, and forward (represented by dashed line 1) the message to server 827. Server 827 may execute the 2D code generation computer application, generate (represented by dashed line 2) the 2D code 824. The 2D code 824 is returned (represented by dashed line 3) to the user system 829 for generation of the embedded image. In yet another alternative, the 2D code may be retrieved from a data network data storage 848 via data network 845 and web server 847. For example, the 2D code may be stored in the data network data storage 848, or the web server 847 may be provided with the user inputted message, execute a 2D code generation computer program that encodes the message into a 2D code, and returns the generated 2D code to the user system 829 via networks 845 and 825.

After generating the embedded image (via steps 230-250 of FIG. 2), the user system 829 may forward the embedded image via a wired or wireless connection to one or more of the peripheral devices 861-869. For example, if the embedded image is to be used in an advertising flyer, the embedded image may be sent to printer 863, or if to be incorporated into a poster or other large printed matter (e.g., billboard advertisement, banner or the like) to a suitable printer/plotter 867. Alternatively, a visual display of the embedded image (i.e., combined results) may be provided via smartphone 861, computer 865 or projector 869 and display surface 868. Of course, the generated embedded image may be optimized in different iterations for presentation on all of the peripheral devices 861-869. The visual display may be provided on an active display device, such as an liquid crystal display (LCD) panel, LCD projector, digital light processing (DLP) projector, organic light emitting diode (OLED) display, cathode ray tube (CRT) monitor or plasma display.

Of course other examples are contemplated, such as, the server 827, or the web server 847, being provided with the image 822 and the 2D code 824, and generating an embedded image according to the above described examples.

As shown by the above discussion, functions relating to the described image embedding may be implemented on computers connected for data communication via the components of a packet data network, operating as a user device and/or as a server as shown in FIG. 8. Although special purpose devices may be used, such devices also may be implemented using one or more hardware platforms intended to represent a general class of user's data processing device commonly used to run "client" programming and/or a general class of data processing device commonly used to run "server" programming. The user device may correspond to user system 829 whereas the server computer may be configured to implement the embedded image generation functions discussed above.

As known in the data processing and communications arts, a general-purpose computing device, computer or computer system typically comprises a central processor or other processing device, internal data connection(s), various types of memory or storage media (RAM, ROM, EEPROM, cache memory, disk drives etc.) for code and data storage, and one or more network interfaces for communication purposes. The software functionalities involve programming, including executable code as well as associated stored data, e.g., files used for the embedded image generation service/function(s). The software code is executable by the general-purpose computer that functions as the data network server 847 or network server 827 and/or that functions as an embedded image generation user system 829. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for generating an embedded image, in essentially the manner performed in the implementations discussed and illustrated herein. Although those skilled in the art likely are familiar with the structure, programming and general operation of such computer systems, it may be helpful to consider some high-level examples.

Figure 9:
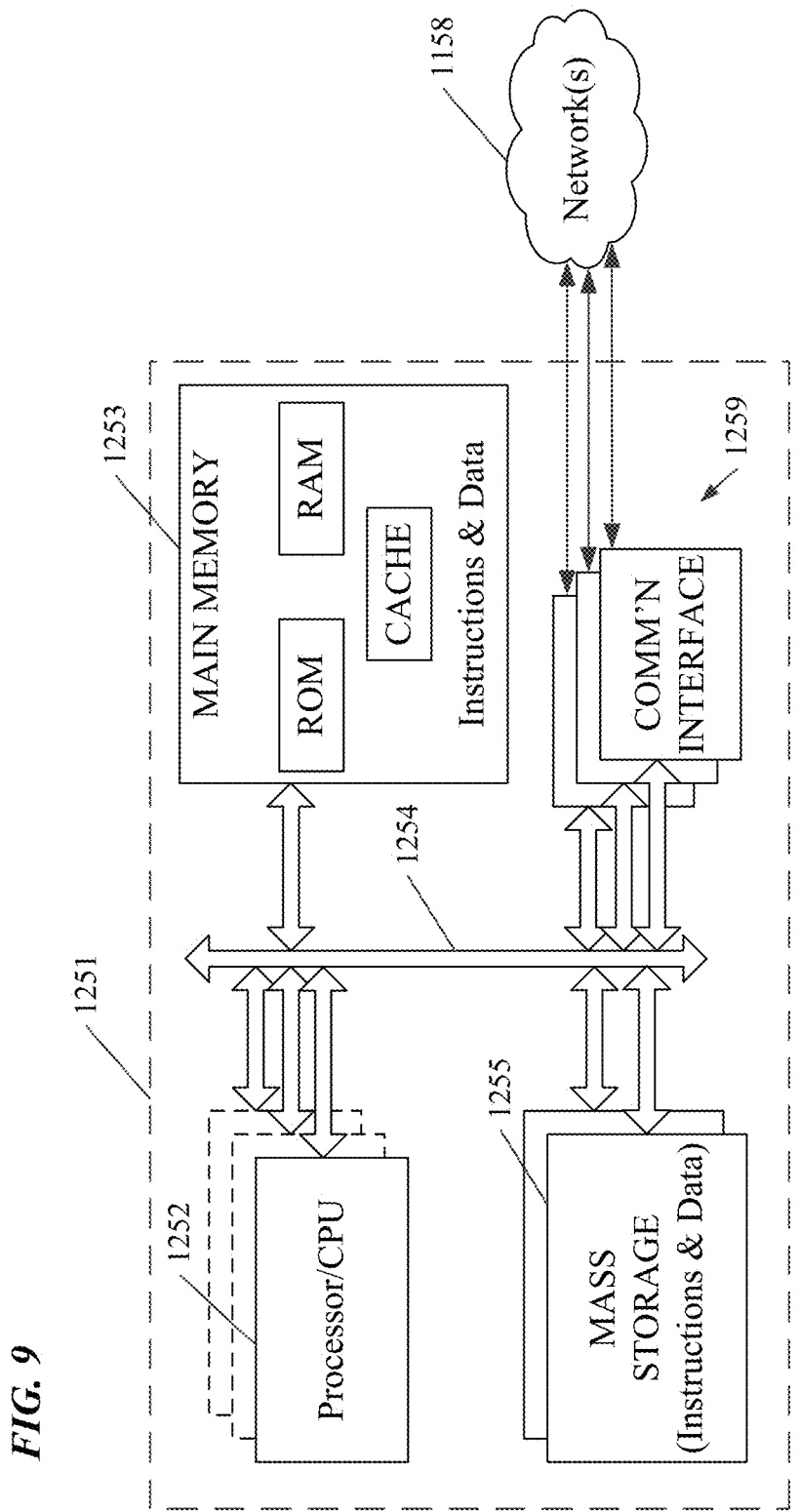
FIG. 9 is a simplified functional block diagram of a personal computer or other work station or terminal device.
Figure 10:
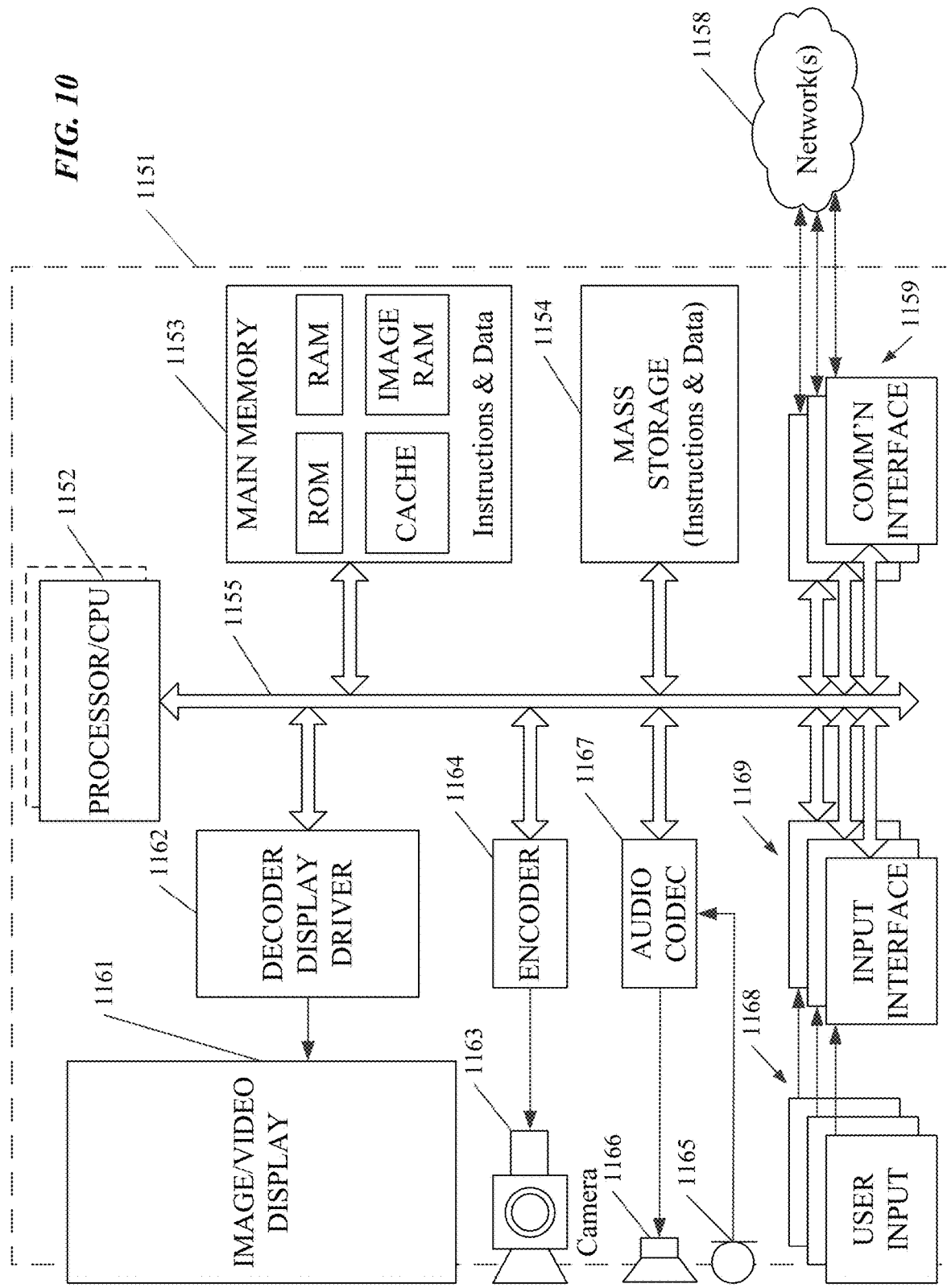
FIG. 10 is a simplified functional block diagram of a computer that may be configured as a host or server, for example, to function as the user system in the system of FIG. 8.

FIGS. 9 and 10 provide functional block diagram illustrations of general purpose computer hardware platforms. FIG. 9 depicts a computer with user interface elements, as may be used to implement a client computer or other type of work station or terminal device, although the computer of FIG. 9 may also act as a host or server if appropriately programmed. FIG. 10 illustrates a network or host computer platform, as may typically be used to implement a server.

With reference to FIG. 9, a user device type computer system 1151, which may serve as the user system 829, includes processor circuitry forming a central processing unit (CPU) 1152. The circuitry implementing the CPU 1152 may be based on any processor or microprocessor architecture such as a Reduced instruction set computing (RISC) using an ARM architecture, as commonly used today in mobile devices and other portable electronic devices, or a microprocessor architecture more commonly used in computers such as an instruction set architecture (ISA) or Complex instruction set computing (CISC) architecture. The CPU 1152 may use any other suitable architecture. Any such architecture may use one or more processing cores. The CPU 1152 may contain a single processor/microprocessor, or it may contain a number of microprocessors for configuring the computer system 1152 as a multi-processor system.

The computer system 1151 also includes a main memory 1153 that stores at least portions of instructions for execution by and data for processing by the CPU 1152. The main memory 1153 may include one or more of several different types of storage devices, such as read only memory (ROM), random access memory (RAM), cache and possibly an image memory (e.g. to enhance image/video processing). Although not separately shown, the memory 1153 may include or be formed of other types of known memory/storage devices, such as PROM (programmable read only memory), EPROM (erasable programmable read only memory), FLASH-EPROM, or the like.

The system 1151 also includes one or more mass storage devices 1154 (i.e., memory). Although a storage device 1154 could be implemented using any of the known types of disk drive or even tape drive, the trend is to utilize semiconductor memory technologies, particularly for portable or handheld system form factors. As noted, the main memory 1153 stores at least portions of instructions for execution and data for processing by the CPU 1152. The mass storage device 1154 provides longer term non-volatile storage for larger volumes of program instructions and data. For a personal computer, or other similar device example, the mass storage device 1154 may store the operating system and application software as well as content data, e.g. for uploading to main memory and execution or processing by the CPU 1152. Examples of content data include messages and documents, and various multimedia content files (e.g. images, audio, video, text and combinations thereof), Instructions and data can also be moved from the CPU 1152 and/or memory 1153 for storage in device 1154.

The processor/CPU 1152 is coupled to have access to the various instructions and data contained in the main memory 1153 and mass storage device 1154. Although other interconnection arrangements may be used, the example utilizes an interconnect bus 1155. The interconnect bus 1155 also provides internal communications with other elements of the computer system 1151.

The system 1151 also includes one or more input/output interfaces for communications, shown by way of example as several interfaces 1159 for data communications via a network 1158. The network 1158 may be or communicate with the network 825 of FIG. 8. Although narrowband modems are also available, increasingly each communication interface 1159 provides a broadband data communication capability over wired, fiber or wireless link. Examples include wireless (e.g. WiFi) and cable connection Ethernet cards (wired or fiber optic), mobile broadband 'aircards,' and Bluetooth access devices. Infrared and visual light type wireless communications are also contemplated. Outside the system 1151, the interface provide communications over corresponding types of links to the network 1158. In the example, within the system 1151, the interfaces communicate data to and from other elements of the system via the interconnect bus 1155.

For operation as a user terminal device, the computer system 1151 further includes appropriate input/output devices and interface elements. The example offers visual and audible inputs and outputs, as well as other types of inputs. Although not shown, the system may also support other types of output, e.g. via a printer. The input and output hardware devices are shown as elements of the device or system 1151, for example, as may be the case if the computer system 1151 is implemented as a portable computer device (e.g. laptop, notebook or ultrabook), tablet, smartphone or other handheld device. In other implementations, however, some or all of the input and output hardware devices may be separate devices connected to the other system elements via wired or wireless links and appropriate interface hardware.

For visual output, the computer system 1151 includes an image or video display 1161 and an associated decoder and display driver circuit 1162. The display 1161 may be a projector or the like but typically is a flat panel display, such as a liquid crystal display (LCD). The decoder function decodes video or other image content from a standard format, and the driver supplies signals to drive the display 1161 to output the visual information. The CPU 1152 controls image presentation on the display 1161 via the display driver 1162, to present visible outputs from the device 1151 to a user, such as application displays and displays of various content items (e.g. still images, videos, messages, documents, and the like).

In the example, the computer system 1151 also includes a camera 1163 as a visible light image sensor. Various types of cameras may be used. The camera 1163 typically can provide still images and/or a video stream, in the example to an encoder 1164. The encoder 1164 interfaces the camera to the interconnect bus 1155. For example, the encoder 164 converts the image/video signal from the camera 1163 to a standard digital format suitable for storage and/or other processing and supplies that digital image/video content to other element(s) of the system 1151, via the bus 1155. Connections to allow the CPU 1152 to control operations of the camera 1163 are omitted for simplicity.

Although not necessary for implementation of any of the methods described herein, the exemplary computer system 1151 includes a microphone 1165, one or more speakers 1166, an audio coder/decoder (CODEC), as shown at 1167, to interface audio to/from the digital media of the interconnect bus 1155.

Depending on the form factor and intended type of usage/applications for the computer system 1151, the system 1151 will include one or more of various types of additional user input elements, shown collectively at 1168. Each such element 1168 will have an associated interface 1169 to provide responsive data to other system elements via bus 1155. Examples of suitable user inputs 1168 include a keyboard or keypad, a cursor control (e.g. a mouse, touchpad, trackball, cursor direction keys etc.).

Another user interface option provides a touchscreen display feature. At a high level, a touchscreen display is a device that displays information to a user and can detect occurrence and location of a touch on the area of the display. The touch may be an actual touch of the display device with a finger, stylus or other object; although at least some touchscreens can also sense when the object is in close proximity to the screen. Use of a touchscreen display as part of the user interface enables a user to interact directly with the information presented on the display. The display may be essentially the same as discussed above relative to element 1161 as shown in the drawing. For touch sensing, however, the user inputs 1168 and interfaces 1169 would include a touch/position sensor and associated sense signal processing circuit. The touch/position sensor is relatively transparent, so that the user may view the information presented on the display 1161. The sense signal processing circuit receives sensing signals from elements of the touch/position sensor and detects occurrence and position of each touch of the screen formed by the display and sensor. The sense circuit provides touch position information to the CPU 1152 via the bus 1155, and the CPU 1152 can correlate that information to the information currently displayed via the display 1161, to determine the nature of user input via the touchscreen.

A mobile device type user terminal may include elements similar to those of a laptop or desktop computer, but will typically use smaller components that also require less power, to facilitate implementation in a portable form factor. Some portable devices include similar but smaller input and output elements. Tablets and smartphones, for example, utilize touch sensitive display screens, instead of separate keyboard and cursor control elements.

Each computer system 1151 runs a variety of applications programs and stores data, enabling one or more interactions via the user interface, provided through elements, and/or over the network 1158 to implement the desired user device processing for the embedded image generation service or the processing of 2D codes and images for generating embedded images. The user computer system/device 1151, for example, runs a computer application, such a web browser and/or a separate embedded image generation and/or color optimization application programs.

Turning now to consider a server or host computer, FIG. 10 is a functional block diagram of a general-purpose computer system 1251, which may perform the functions of the web (or data network) server 847, the network server 827, the user system 829 or the like. The web server 847 may manage or access the data storage 848 based on requests received via data network 845 and similarly the network server 827 may manage or access the data storage 847 based on requests received via network 825.

The example 1251 will generally be described as an implementation of a server computer, e.g. as might be configured as a blade device in a server farm. Alternatively, the computer system may comprise a mainframe or other type of host computer system capable of web-based communications, media content distribution, or the like via the network 1158. Although shown as the same network as served the user computer system 1151, the computer system 1251 may connect to a different network.

The computer system 1251 in the example includes a central processing unit (CPU) 1252, a main memory 1253, mass storage 1255 and an interconnect bus 1254. These elements may be similar to elements of the computer system 1151 or may use higher capacity hardware. The circuitry forming the CPU 1252 may contain a single microprocessor, or may contain a number of microprocessors for configuring the computer system 1252 as a multi-processor system, or may use a higher speed processing architecture. The main memory 1253 in the example includes ROM, RAM and cache memory; although other memory devices may be added or substituted. Although semiconductor memory may be used in the mass storage devices 1255, magnetic type devices (tape or disk) and optical disk devices typically provide higher volume storage in host computer or server applications. In operation, the main memory 1253 stores at least portions of instructions and data for execution by the CPU 1252, although instructions and data are moved between memory and storage and CPU via the interconnect bus in a manner similar to transfers discussed above relative to the system 1151 of FIG. 9.

The system 1251 also includes one or more input/output interfaces for communications, shown by way of example as interfaces 1259 for data communications via the network 23. Each interface 1259 may be a high-speed modem, an Ethernet (optical, cable or wireless) card or any other appropriate data communications device. To provide the embedded image generation service to a large number of users' client devices, the interface(s) 1259 preferably provide(s) a relatively high-speed link to the network 1158. The physical communication link(s) may be optical, wired, or wireless (e.g., via satellite or cellular network).

Although not shown, the system 1251 may further include appropriate input/output ports for interconnection with a local display and a keyboard or the like serving as a local user interface for configuration, programming or troubleshooting purposes. Alternatively, the server operations personnel may interact with the system 1251 for control and programming of the system from remote terminal devices via the Internet or some other link via network 1158.

The computer system 1251 runs a variety of applications programs and stores the data in data storage, such as data storage 828 or 848 for the embedded image generation service. One or more such applications enable the delivery of web pages and/or the generation of e-mail messages or the like for delivering one or more of a message of encoding in a 2D code, the 2D code encoded with the message, the graphic image, and the embedded image, which is the combination of the 2D code encoded with the message and the graphic image. Those skilled in the art will recognize that the computer system 1251 may run other programs and/or host other web-based or e-mail based messaging services.

The example (FIG. 10) shows a single instance of a computer system 1251. Of course, the server or host functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like 1151, 1251 generally are conventional in nature, and it is presumed that those skilled in the art are sufficiently familiar therewith to understand implementation of the present embedded image generation techniques using suitable configuration and/or programming of such computer system(s) particularly as outlined above relative to 1151 of FIG. 9 and 1251 of FIG. 10.

Hence, aspects of the methods of generating an embedded image outlined above may be embodied in programming, e.g. in the form of software, firmware, or microcode executable by a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a 2D code generation and/or graphic image service provider into the computer platform of the user system that will be the network server and/or the computer platform of the user that will be the client device for embedded image generation service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the processes of generating an embedded image, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of described examples. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising the steps of:
    obtaining, by a processor, a non-binary original graphic image, wherein the non-binary original graphic image is represented as a graphic image matrix with M rows and N columns of pixels, each pixel having a luminance value and row and column coordinates within the M by N graphic image matrix;
    obtaining a two dimensional code image, wherein the two dimensional code image is represented as a two dimensional code matrix with M rows and N columns of pixels, each two dimensional code image pixel having either a first value or a second value, and row and column coordinates within the M by N two dimensional matrix;
    identifying pixels in a sub-block of the non-binary original graphic image for value modification according to a matrix structure of the two dimensional code image;
    calculating optimal modified pixel luminance values for the identified pixels in the non-binary original graphic image sub-block based on a probability of decoding error model related to decoding of the two dimensional code image embedded within the non-binary original graphic image, wherein the optimal modified pixel luminance values are calculated to minimize a visual distortion metric with respect to the non-binary original graphic image while maintaining probability of decoding error below a predefined threshold as calculated by the probability of decoding error model, the probability of decoding error model including a first component corresponding to identified pixels in a priority region of the sub-block and a second component corresponding to identified pixels outside the priority region; and
    replacing pixel values in the sub-block of the non-binary original graphic image with the modified pixel luminance values, wherein the replaced pixel values in the non-binary original graphic image sub-block are from an identical pixel row and column coordinate from a two dimensional code image sub-block.

2. The method of claim 1, wherein the step of identifying pixels in the non-binary original graphic image sub-block for value modification according to the structure of the two dimensional code image, comprises:
    applying a first filter to the non-binary original graphic image sub-block in order to identify a group of center pixels in the graphic image sub-block;
    storing the results of the application of the first filter to the non-binary original graphic image sub-block in memory;
    applying a second filter to the non-binary original graphic image sub-block in order to identify a group of pixels suitable for value modification outside the group of center pixels; and
    storing the results of the application of the second filter to the non-binary original graphic image sub-block in memory.

3. The method of claim 1, further comprising:
    determining an optimal value for calculating the modified pixel luminance values of the identified pixels based on a cost function, wherein the cost function calculates distortion of the non-binary original graphic image as embedded in the two dimensional code image; and
    based on the selected probability of decoding error model, optimizing image characteristic parameters used in modifying pixel values of the non-binary original graphic image sub-block.

4. The method of claim 1, further comprising, based on a selected probability of decoding error mode, optimizing image characteristic parameters used in calculating pixel values of the non-binary original graphic image sub-block, wherein the probability of decoding error model uses components of an original luminance value of the graphic image obtained by the processor, the priority pixels in the identified non-binary original graphic image sub-block, and the group of pixels outside the group of priority pixels.

5. The method of claim 1, wherein the priority region is a center region of the sub-block.

6. A method comprising the steps of:
    receiving, by a processor, a two dimensional code image, wherein the received two dimensional code image is a matrix of two dimensional code pixels, wherein each pixel of the matrix is one of two unique two dimensional code pixel values;
    retrieving a non-binary original graphic image from a data storage, wherein the non-binary original graphic image is comprised of a matrix of graphic image pixels, and each graphic image pixel of the non-binary original graphic image matrix has a luminance value defined as a function of the non-binary original graphic image stored in the data storage;
    dividing the two dimensional code matrix into two dimensional code matrix sub-blocks;
    dividing the non-binary original graphic image matrix into non-binary graphic image matrix sub-blocks;
    modifying a non-binary original graphic image pixel value inside one of the non-binary original graphic image sub-blocks based upon a pixel value of a two dimensional code pixel in a corresponding two dimensional code sub-block;

replacing a non-binary original graphic image pixel value in the corresponding sub-block of the two dimensional code matrix with the modified non-binary original graphic image pixel value; and minimizing a cost function to derive the modified non-binary original graphic image pixel value inside the non-binary original image sub-block.

7. The method of claim 6, wherein the non-binary original graphic image is a gray-scale image having a single scalar value for each element in the matrix.

8. The method of claim 6, wherein the non-binary original graphic image is a color image composed of a red, green, and blue scalar value for each element in the matrix.

9. The method of claim 6, wherein the modifying comprises:

replacing the non-binary original graphic pixel value based on a location determined according to a predetermined ordering of the graphic image pixels to be modified.

10. The method of claim 6, further comprising:

minimizing a cost function to derive the modified non-binary original graphic image pixel value inside the non-binary original graphic image sub-block.

11. A system comprising:

a data storage; and a processor, coupled to the data storage, wherein the processor is programmed with machine-readable instructions for controlling the system to perform functions, including functions to:

receive a two dimensional code image for encoding, wherein the generated two dimensional code image is represented as a matrix of two dimensional code pixels and wherein each pixel of the matrix is one of two unique two dimensional code values;

retrieve a non-binary original graphic image from a data storage, wherein the non-binary original graphic image is comprised of a matrix of non-binary graphic image pixels, and each non-binary graphic image pixel in the non-binary graphic image matrix has a luminance value defined as a function of the non-binary original image stored in the data storage;

divide the two dimensional code matrix into two dimensional code matrix sub-blocks, wherein each two dimensional code sub-block has m rows and n columns of two dimensional code sub-block elements;

divide the non-binary original graphic image matrix into non-binary graphic image matrix sub-blocks, wherein each non-binary graphic image sub-block has luminance value and m rows and n columns of non-binary graphic image sub-block elements;

modify a non-binary original graphic image pixel value inside one of the non-binary graphic image sub-blocks based upon a luminance pixel value of a two dimensional code pixel in a corresponding two dimensional code sub-block with the same element rows and columns as the graphic image sub-block; and replace a non-binary original graphic image pixel value in a corresponding sub-block of the two dimensional code matrix with the modified non-binary graphic image pixel value, wherein the machine-readable instructions for controlling the system to perform the function to modify the non-binary original graphic image pixel value further comprises instructions for performing a function to:

minimize a cost function to derive the modified non-binary original graphic image pixel value.

12. A system comprising:

a data storage; and a processor, coupled to the data storage, wherein the processor is programmed with machine-readable instructions for controlling the system to perform functions, including functions to:

receive a two dimensional code image for encoding, wherein the generated two dimensional code image is represented as a matrix of two dimensional code pixels and wherein each pixel of the matrix is one of two unique two dimensional code values;

retrieve a non-binary original graphic image from a data storage, wherein the non-binary original graphic image is comprised of a matrix of non-binary graphic image pixels, and each non-binary graphic image pixel in the non-binary graphic image matrix has a luminance value defined as a function of the non-binary original image stored in the data storage;

divide the two dimensional code matrix into two dimensional code matrix sub-blocks, wherein each two dimensional code sub-block has m rows and n columns of two dimensional code sub-block elements;

divide the non-binary original graphic image matrix into non-binary graphic image matrix sub-blocks, wherein each non-binary graphic image sub-block has luminance value and m rows and n columns of non-binary graphic image sub-block elements;

modify a non-binary original graphic image pixel value inside one of the non-binary graphic image sub-blocks based upon a luminance pixel value of a two dimensional code pixel in a corresponding two dimensional code sub-block with the same element rows and columns as the graphic image sub-block; and replace a non-binary original graphic image pixel value in a corresponding sub-block of the two dimensional code matrix with the modified non-binary graphic image pixel value, wherein the machine-readable instructions for controlling the system to perform the function to modify the non-binary original graphic image pixel value further comprises instructions for performing a function to:

impose a constraint on a probability of decoding error to derive the modified non-binary original graphic image pixel value.

13. The system of claim 12, wherein the constraint on the probability of decoding error is derived from application of a priority mask to the non-binary original graphic image.

14. A system comprising:

a data storage; and a processor, coupled to the data storage, wherein the processor is programmed with machine-readable instructions for controlling the system to perform functions, including functions to:

receive a two dimensional code image for encoding, wherein the generated two dimensional code image is represented as a matrix of two dimensional code pixels and wherein each pixel of the matrix is one of two unique two dimensional code values;

retrieve a non-binary original graphic image from a data storage, wherein the non-binary original graphic image is comprised of a matrix of non-binary graphic image pixels, and each non-binary graphic image pixel in the non-binary graphic image matrix has a luminance value defined as a function of the non-binary original image stored in the data storage;

divide the two dimensional code matrix into two dimensional code matrix sub-blocks, wherein each two dimensional code sub-block has m rows and n columns of two dimensional code sub-block elements;

divide the non-binary original graphic image matrix into non-binary graphic image matrix sub-blocks, wherein each non-binary graphic image sub-block has luminance value and m rows and n columns of non-binary graphic image sub-block elements;

modify a non-binary original graphic image pixel value inside one of the non-binary graphic image sub-blocks based upon a luminance pixel value of a two dimensional code pixel in a corresponding two dimensional code sub-block with the same element rows and columns as the graphic image sub-block; and replace a non-binary original graphic image pixel value in a corresponding sub-block of the two dimensional code matrix with the modified non-binary graphic image pixel value, wherein the machine-readable instructions for controlling the system to perform the function to modify the non-binary original graphic image luminance pixel value further comprises instructions for performing functions to:

apply a priority mask centered on the one non-binary graphic image sub-block;

apply the priority mask centered on the two dimensional code sub-block with the same element rows and columns as the non-binary graphic image sub-block;

based on the results of the applied priority mask, derive a probability of decoding error; and identify a unique coordinate location and value for each modified non-binary graphic image pixel in the graphic image sub-block.

15. The system of claim 14, wherein the processor is further configured to control the system to perform functions, including functions to:

derive a cost function based on the probability of decoding error; and determine an optimal value of the modified non-binary original graphic image pixel based on the results of the cost function.

16. The system of claim 15, wherein the machine-readable instructions for controlling the system to perform the function of modifying the sub-set of element values further comprises instructions for performing functions to:

optimize color space luminance values based on a cost function and a target luminance for a color space of the non-binary original graphic image.

17. The system of claim 16, wherein the probability of decoding error is composed as a linear combination of: a probability of detection error and a probability of binarization error.

* * * * *